(12) United States Patent
Hasebe et al.

(10) Patent No.: US 6,483,875 B1
(45) Date of Patent: *Nov. 19, 2002

(54) PICTURE SIGNAL PROCESSING APPARATUS

(75) Inventors: Atsushi Hasebe, Kanagawa (JP); Satoshi Yoneya, Kanagawa (JP); Norio Ebihara, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,308

(22) Filed: Jun. 19, 1997

(51) Int. Cl.$^7$ ................................................ H04B 1/66
(52) U.S. Cl. ............................ 375/240.15; 375/240.12; 348/700
(58) Field of Search ................................ 348/390, 423, 348/700, 402, 400, 392, 391, 393, 394, 395, 396, 397, 426, 630, 631, 708, 699; 386/111, 109, 112; 375/240.15, 240.12, 240.13

(56) References Cited

U.S. PATENT DOCUMENTS

| | | | |
|---|---|---|---|
| 5,305,438 A | * | 4/1994 | Mackay et al. ............ 386/112 |
| 5,500,686 A | * | 3/1996 | Yamaguchi et al. ........ 348/669 |
| 5,786,858 A | * | 7/1998 | Yagasaki et al. ............ 348/415 |
| 5,897,219 A | * | 4/1999 | Yoo et al. .................... 386/111 |
| 5,909,252 A | * | 6/1999 | Ueda et al. .................. 386/111 |
| 5,912,709 A | * | 6/1999 | Takahashi .................... 348/416 |

* cited by examiner

Primary Examiner—Nhon Diep
Assistant Examiner—Gims Philippe
(74) Attorney, Agent, or Firm—Frommer Lawrence & Haug LLP; William S. Frommer

(57) ABSTRACT

A matrix switcher selectively seizes plural compressed pictures and converts P-frames in a GOP into I-frames while modifying prediction data of B-frames in the GOP. A decoder expands the compressed pictures into original pictures. An input buffer memory converts the picture signals into component signals while converting the transfer rate. A picture processing unit performs various picture signal processing operations on the picture signals. An encoder encodes the processed picture signals for compression. An output buffer memory converts the transfer rate of sent-out data which are compressed processed signals. A controller controls processing operations by the matrix switcher, decoder, input buffer memory, picture processing unit, encoder and the output buffer memory. The compressed pictures processed by inter-frame compression can be switched smoothly. Moreover, picture processing can be performed on a wide gamut of pictures from still pictures to moving pictures, free-format pictures, pictures not dependent on transfer rate and on scalable-format pictures.

7 Claims, 17 Drawing Sheets

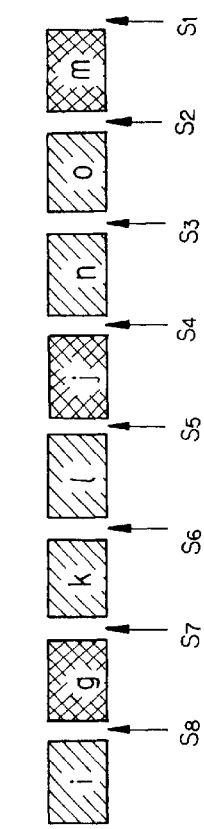

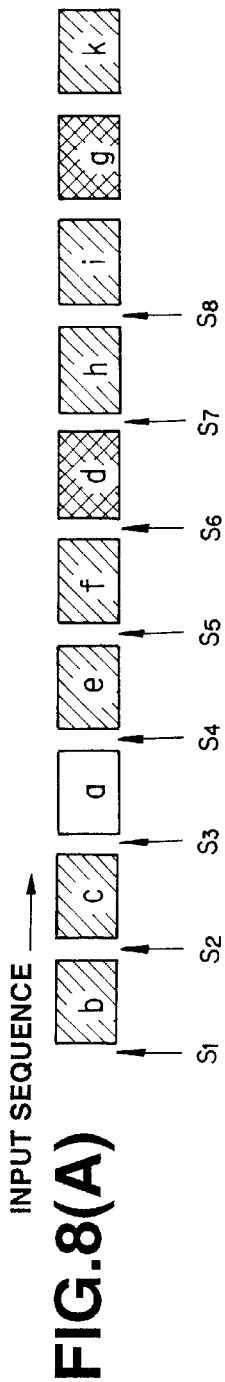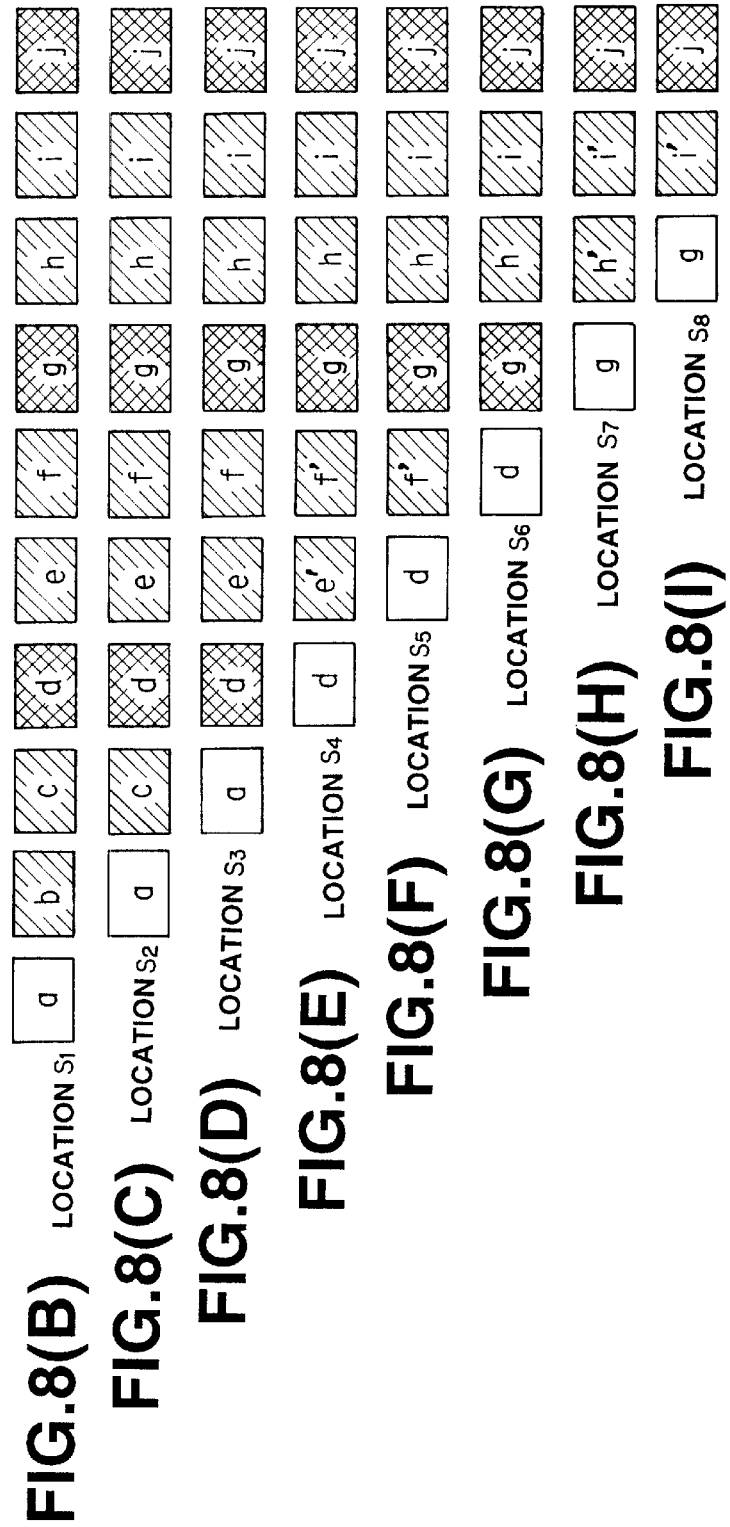

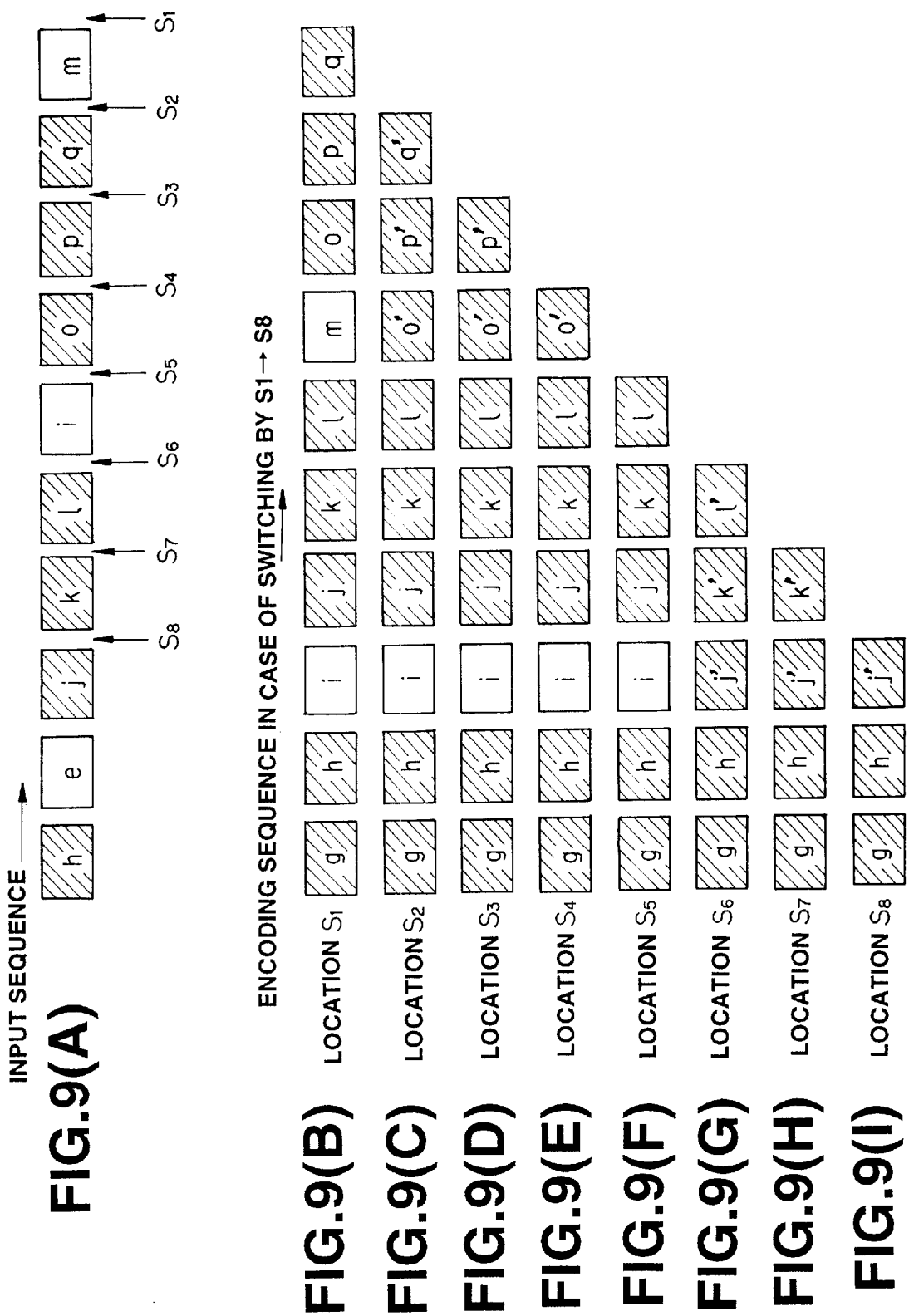

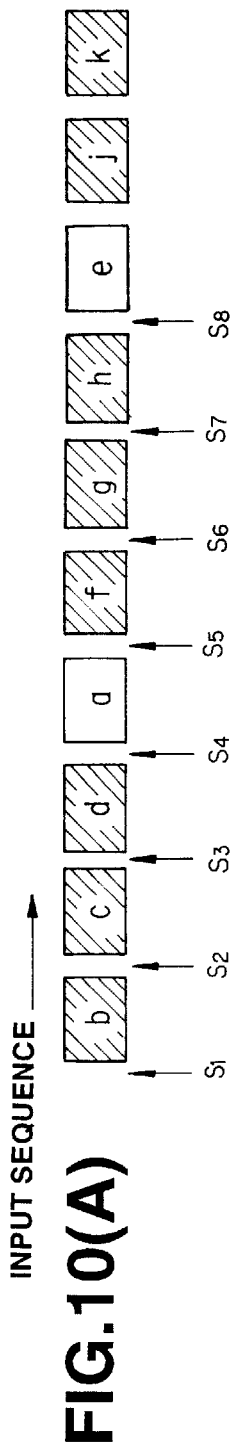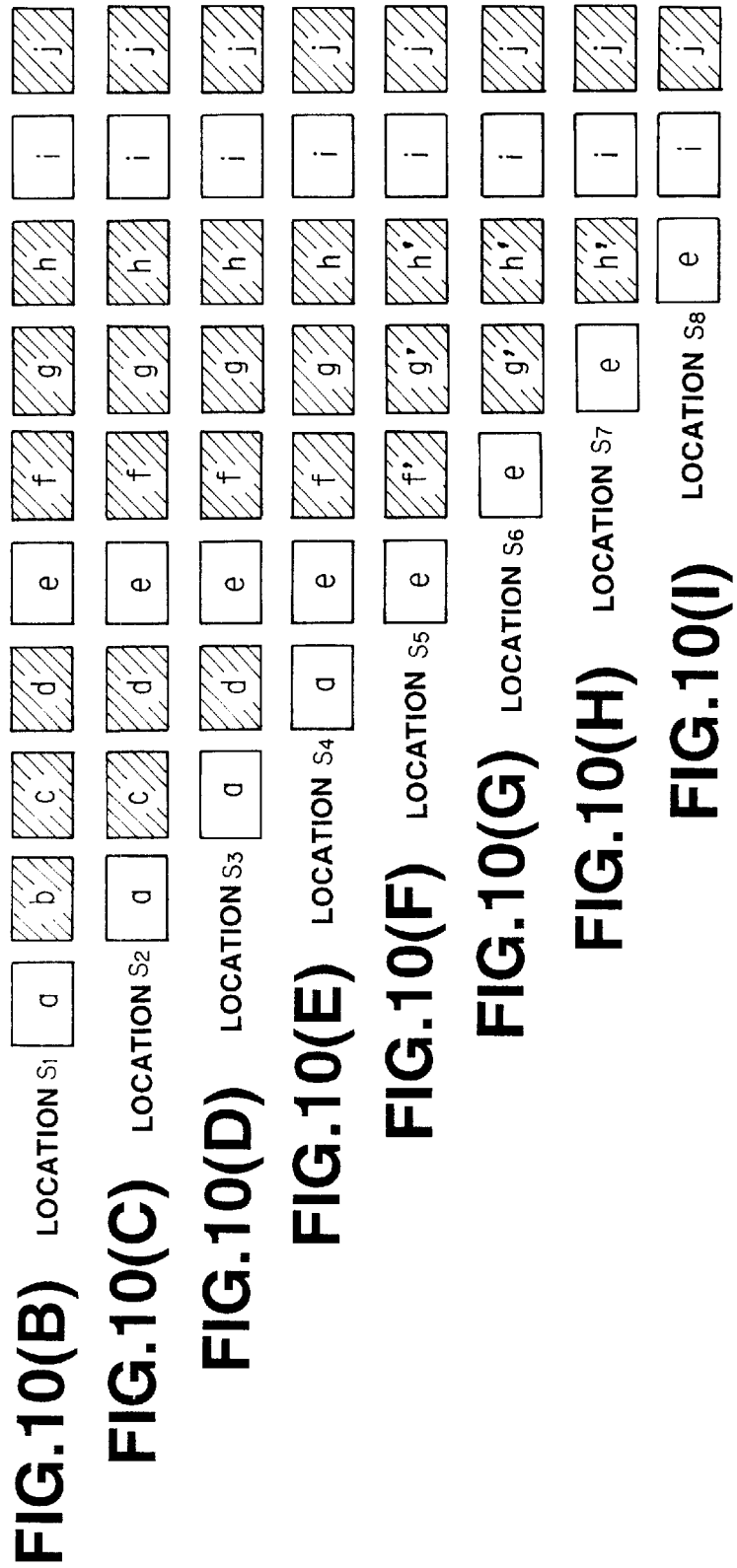

PICTURE SIGNAL PROCESSING APPARATUS

BACKGROUND OF THE INVENTION

1. Field of the Invention

This invention relates to a picture signal processing device for performing processing operations, such as synthesis, deformation or color conversion of picture signals.

2. Description of the Related Art

A picture signal processing device performs picture processing, such as synthesis or color conversion of pictures as it selects plural from plural input picture signals. For example, the picture information processing device synthesizes picture signals of two systems as it switches between the two systems using a switcher as switching means.

This picture signal processing device receives composite signals, as standard-format picture signals (shown as Composite in the drawings), Y/C signals and component signals (shown as Component in the drawings) via a switcher 141, as shown in FIG. 1. The picture signal processing device performs picture processing on the composite signals. Thus it becomes necessary to convert the Y/C signals and composite signals other than the component signals into component signals downstream of the switcher 141.

First, the composite signals are separated by a Y/C separation circuit 142 into Y and C signals so as to be then converted by a decoder 143 into Y, R-Y and B-Y signals as component signals. The Y/C signals are converted by the decoder 143 into component signals. The component signals, outputted by the decoder 143, are sent to an A/D converter 144, which then converts the component signals into digital signals based on clocks of a write clock generator 145. The digital component signals are sent to a frame synchronizer 146.

The frame synchronizer 146 writes the digital component signals in an internal frame memory based on external clock signals (shown as EXT key in the drawings) generated from the above standard format picture signals and reads out the digital component signals therefrom to adjust the frame position or color subcarrier phase in order to adjust the signals for digital multi-effect (DME) processing as later explained. The digital component signals outputted by the frame synchronizer 146 are sent to a switcher 147.

A Y/C separation circuit 148, a decoder 149, an A/D converter 150, a write clock generator 151 and a frame synchronizer 152 perform processing similar to that described above on the standard format picture signals of the other system via switcher 141. The digital component signals outputted by a frame 152 are also sent to the switcher 147. The switcher 147 is fed with Y, R-Y and B-Y digital component signals from a test pattern signal generator 153 generating test pattern signals, such as color background signals, color bar signals or grid signals.

The digital component signals via switcher 147 are sent to a two-dimensional variable low-pass filter (LPF) 154. This two-dimensional variable LPF 154 removes high-frequency components of the digital component signals for generating no aliasing in the digital component signals. The digital component signals, freed of the high-frequency components, are sent to a field memory 155, which is also fed with write and readout addresses from a system controller 157 via a DME processor 158. In keeping with instructions from the system controller 157, the DME processor 158 performs picture processing, such as picture synthesis, color conversion or geometry conversion, on the digital component signals. To this end, the system controller 157 sends data required for desired DME processing to the DME processor 158.

The DME processor 158 performs the above picture signal processing on the digital component signals from the two-dimensional LPF 154, using the field memory 155, in accordance with the addresses and data supplied from the system controller 157.

If the digital component signals are processed by deformation, pixel dropout frequently occurs in the signals read out from the field memory 155. Thus, the signals read out from the field memory 155 are sent to an interpolation circuit 156 for pre-set interpolation. The DME processed signals, outputted from the interpolation circuit 156, are sent to a data mixing circuit 156, which is also fed from the system controller 157 with the addresses same as those sent to the DME processing circuit 158, so that the addresses and data are mixed with the DME processed signals. Mixed output signals of the data mixing circuit 159 are sent to a synthesis circuit 161, which is also fed with the digital component signals delayed by a field delay circuit 160. Thus, these delayed digital component signals are mixed with the mixed output signals. A synthesized output of the synthesis circuit 161 is a signal processed by picture signal processing. The synthesized output is converted by the D/A converter 162 into analog signals which are outputted in the form of analog composite signals, Y/C signals and component signals.

Meanwhile, with the picture signal processing device shown in FIG. 1, the input/output signals are limited to the standard composite signals, Y/C signals and component signals. That is, the device cannot handle picture signals deviating from standard picture signals, such as pictures of different resolution, pictures with different transfer rates or with different picture size. Moreover, the same picture signals with different systems, such as HDTV or NTSC systems, cannot be handled in the same device. That is, the picture signal processing device cannot handle so-called free-format picture signals which are not dependent on resolution, so-called scalable-format picture signals or picture signals with different systems. As a matter of fact, the compressed pictures cannot be handled, so that switching of compressed pictures resulting from inter-frame compression cannot be switched smoothly.

SUMMARY OF THE INVENTION

It is therefore an object of the present invention to provide a picture signal processing device whereby so-called free-format picture signals which are not dependent on resolution, so-called scalable-format picture signals or picture signals with different systems can be processed with various picture processing and whereby switching of compressed pictures resulting from inter-frame compression cannot be switched smoothly.

It is another object of the present invention to provide a picture signal processing device whereby first compressed picture signals and second compressed picture signals, compressed by intra-frame compression and inter-frame compression, respectively, can be switched at desired positions and outputted.

In one aspect, the present invention provides a picture signal processing apparatus including selection means for selectively seizing a plurality of compressed pictures obtained in inter-frame compression, converting inter-frame forward predictively-coded pictures into intra-frame coded pictures, in terms of a pre-set number of frames as a unit, and modifying prediction data of bidirectional predictive-coded pictures, expansion means for expanding compressed picture signals selected by the selection means, first input/output means for inputting/outputting picture signals outputted by the expansion means, picture processing means for performing various picture processing operations on picture signals outputted by the first input/output means for outputting processed picture signals, compression means for compressing the processed picture signals outputted by the picture processing means for outputting compressed processed picture signals, second input/output means for inputting/outputting the compressed picture signals outputted by the expansion means, and control means for controlling the selecting operation by the selection means, expansion processing by the expansion means, input/output processing by the first input/output means, picture processing by the picture processing means, compression by the compression means and input/output processing by the second input/output means.

Preferably, the selection means includes means for suppressing increase in the information volume caused by changes in the prediction data of the bidirectional predictive-coded pictures.

Preferably, the expansion means reads out the attribute information including the compression/non-compression discrimination information, information on the compression system, the information on the picture size dependent on the number of pixels in the horizontal and vertical directions, the information on the size of the processing screen designating a processing area, the information on the picture system, or the input/output signal rate information, and sends the read-out attribute information to the control means.

Preferably, the first input/output means includes a system converter for converting the system of picture signals and a storage unit having a sufficient capacity irrelevant to the picture size of the picture signals.

Preferably, the second input/output means includes a storage unit having a sufficient capacity irrelevant to the picture size of the picture signals.

Preferably, the compression means has a system converter for converting the system of the picture signals.

With the picture signal processing apparatus of the present invention, since selection means selectively seizes plural inter-frame compressed pictures, converts the inter-frame forward predictively-coded pictures into intra-frame coded pictures, in terms of a pre-set number of frames as a unit, and modifies prediction data of bidirectional predictive-coded pictures, inter-frame coded compressed pictures can be switched smoothly. Moreover, since the expansion means expands the compressed input picture signals to output picture signals, and the first input/output means input/output the picture signals under control by the control means, while the first input/output means input or output the picture signals under control by the control means, the picture processing means perform various picture processing operations on the picture signals to output processed picture signals and the compression means compress the processed picture signals and the second input/output means input or output the compressed processed picture signals, various picture processing operations can be performed on so-called free-format picture signals, picture signals not dependent on the transfer rate, so-called scalable format picture signals or picture signals of different systems.

In another aspect, the present invention provides a picture signal processing apparatus including control means for generating signals indicating switching positions, processing means for performing pre-set processing on first compressed picture signals and second compressed picture signals, compressed by intra-frame compression and inter-frame compression, respectively, based on the signals specifying the switching positions supplied from the control means, and selection means. The processing means converts P-pictures of the first compressed picture signals associated with the signals specifying the switching positions into I-pictures, modify prediction data for B-pictures of the first compressed picture signals associated with the signals specifying the switching positions, convert P-pictures of the second compressed picture signals associated with the signals specifying the switching positions into I-pictures, and modify prediction data for B-pictures associated with the signals specifying the switching positions. The selection means selectively outputs the first compressed picture signals and the second compressed picture signals, converted or modified by the processing means, based on the signals specifying the switching positions.

BRIEF DESCRIPTION OF THE DRAWINGS

FIGS. 7A to 7I illustrates the operation of the GOP re-constructing unit of the matrix switcher for a frame queue of the GOP whose encoding sequence is "IBBPBBPBBPBBPBB".

FIGS. 8A to 8I illustrates the operation of the GOP re-constructing unit of the matrix switcher for a frame queue of the GOP whose encoding sequence is "IBBPBBPBBPBBPBB".

FIGS. 9A to 9I illustrates the operation of the GOP re-constructing unit of the matrix switcher for a frame queue of the GOP whose encoding sequence is "IBBBIBBBIBBBIBBB".

FIGS. 10A to 10I illustrates the operation of the GOP re-constricting unit of the matrix switcher for a frame queue of the GOP whose encoding sequence is "IBBBIBBBIBBBIBBB".

DESCRIPTION OF THE PREFERRED EMBODIMENTS

Figure 1:
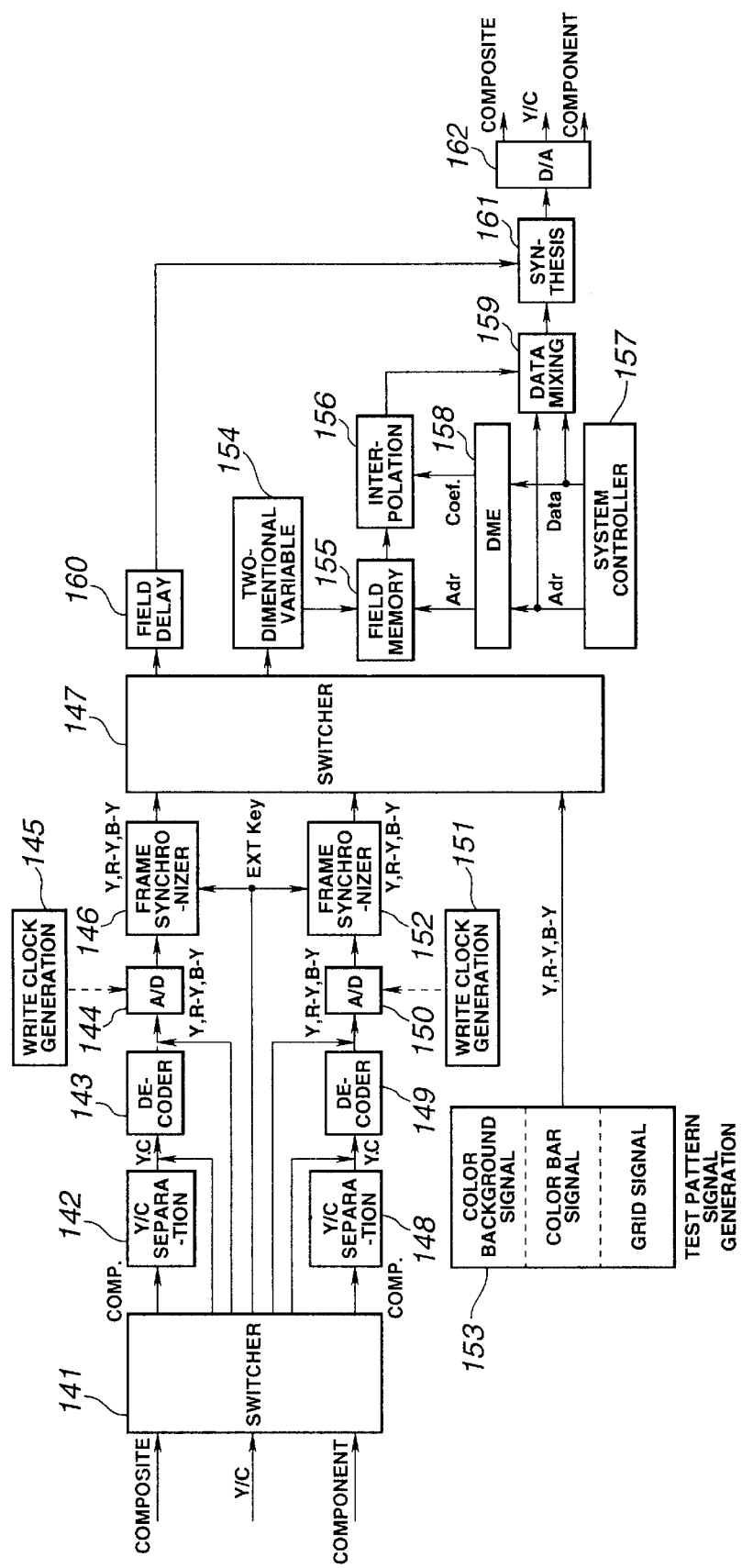
FIG. 1 is a block diagram showing an example of a picture signal processing device.

Referring to the drawings, preferred embodiments of the picture signal processing device of the present invention will be explained in detail. The present embodiment is directed to a picture signal processing device for generating a wide gamut of pictures from a still picture to a moving picture, color conversion, synthesis and editing, and can handle inter-frame compressed picture signals. Among the inter-frame compressed picture signals, there are pictures compressed in accordance with the Moving Picture Coding Experts Group (MPEG) which is an organization for researches into encoding of color still pictures. The picture signal processing device can also handle pictures compressed in accordance with an encoding method standardized by the Joint Photographic Coding Experts Group (JPEG).

Before proceeding to description of the structure of the present embodiment, compression picture processing standardized by MPEG is explained. Among pictures compressed by this compression picture processing, there are an intra-frame coded picture or I-picture, a predictive-coded or P-picture and a bidirectional predictive-coded picture or B-picture. For simplicity of explanation, these I-, P- and B-pictures are referred to as I-, P- and B-frames, respectively. Specifically, the I-frame is a intra-frame encoded frame, the P-frame is a frame encoded using the predictive information of a directly previous frame and the B-frame is a frame encoded using the predictive information of an I-frame or a P-frame which is a previous or a succeeding frame. The compressed pictures are grouped in a compression unit termed a group-of-pictures (GOP). The GOP has a single I-frame and is made up of, for example, 15 frames of "IBBPBBPBBPBBPBB".

Figure 2:
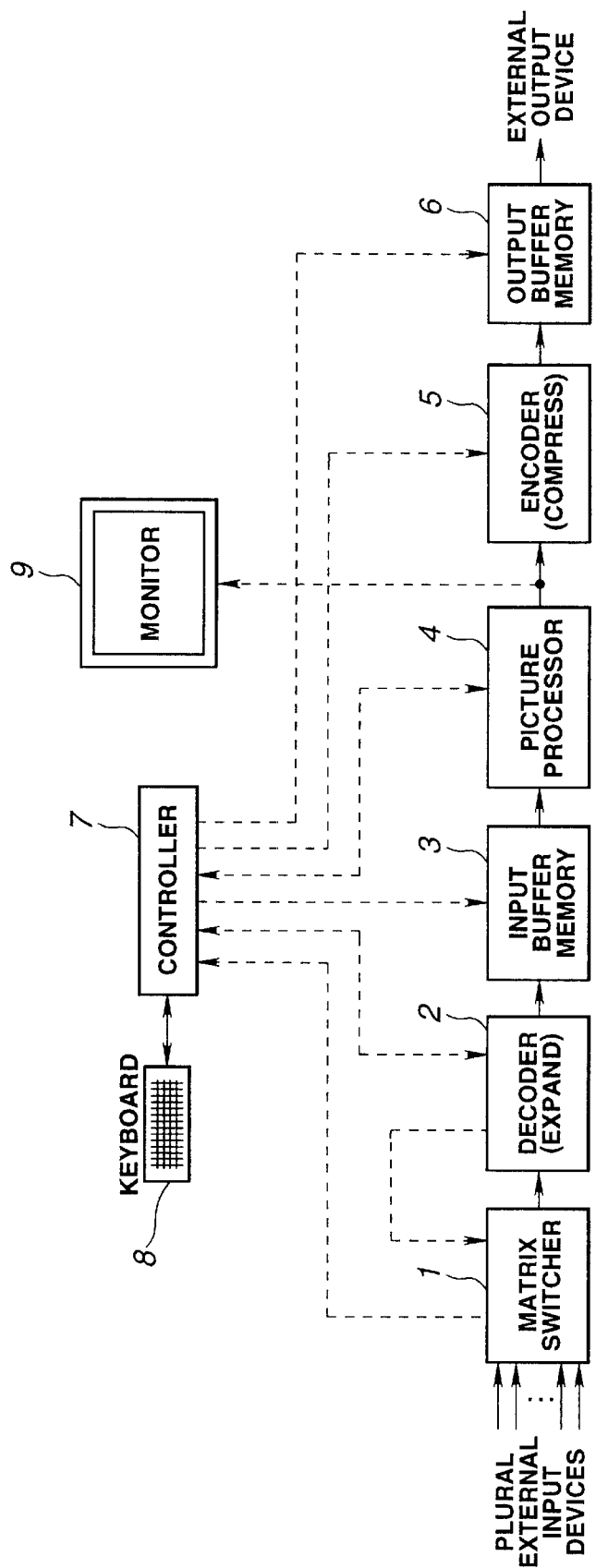
FIG. 2 is a schematic block diagram showing a picture signal processing device according to an embodiment of the present invention.

Referring to FIG. 2, the picture signal processing device includes a matrix switcher 1 for selectively seizing plural compressed pictures supplied from plural external input devices, such as VTR or data recorder, converting a P-frame into an I-frame in the GOP and modifying predictive data of the B-frame, and a decoder 2 for restoring the compressed picture to an original picture. The picture signal processing device also includes an input buffer memory 3 for converting picture signals expanded by the decoder 2 into Y, R-Y, G-Y signals or R, G B component signals and for modifying the transfer rate of the picture signals and a picture processing unit 4 having the function of performing various picture signal processing operations, such as color conversion, deformation, contraction or geometry transformation, on picture signals outputted by the input buffer memory 3. The picture signal processing device also includes an encoder 5 having the function of encoding (compressing) processed signals outputted by the picture processing unit 4, and an output buffer memory 6 having the function of converting the transfer rate of sent-out compressed data from the encoder 5. The picture signal processing device also includes a controller 7 for controlling the operations carried out by the matrix switcher 1, decoder 2, input buffer memory 3, picture processing unit 4, encoder 5 and the output buffer memory 6. To the picture signal processing device are connected a keyboard 8 as means for supplying processing parameters or processing control data from outside and a monitor 9 for displaying processing results or input pictures.

Figure 3:
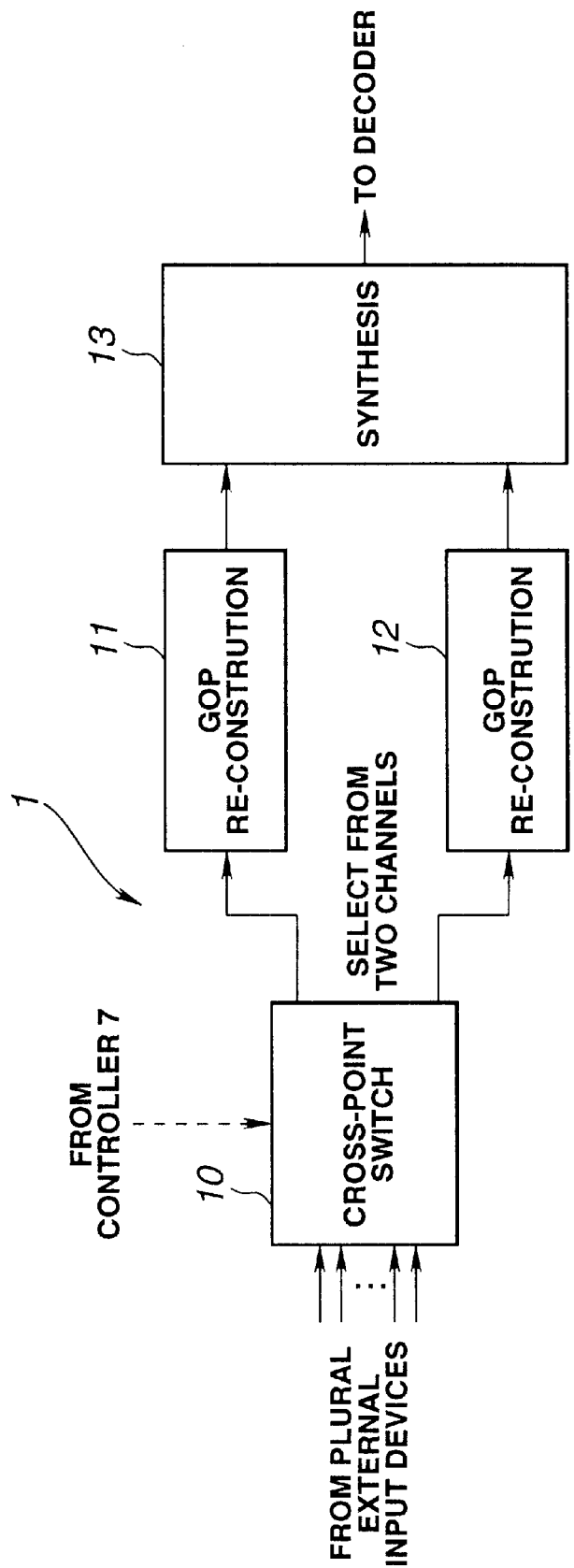
FIG. 3 is a block diagram showing a detailed structure of a matrix switcher of the picture signal processing device shown in FIG. 2.

Referring to FIG. 3, the matrix switcher 1 includes a cross-point switch 10, GOP re-constructing units 11, 12 and a synthesis unit 13. The cross-point switch 10 is supplied with plural channels of encoded pictures from the plural external input devices and selects, for example, two channels of encoded pictures under control by the controller 7. If a channel of contiguous pictures is cut at an intermediate position in a GOP and connected to another channel of contiguous pictures, the GOP re-constructing units 11, 12 re-construct an incomplete GOP of the former channel of contiguous pictures to a complete GOP. The synthesis unit 13 interconnects two GOP pictures re-constructed by the GOP re-constructing units 11, 12.

Figure 4:
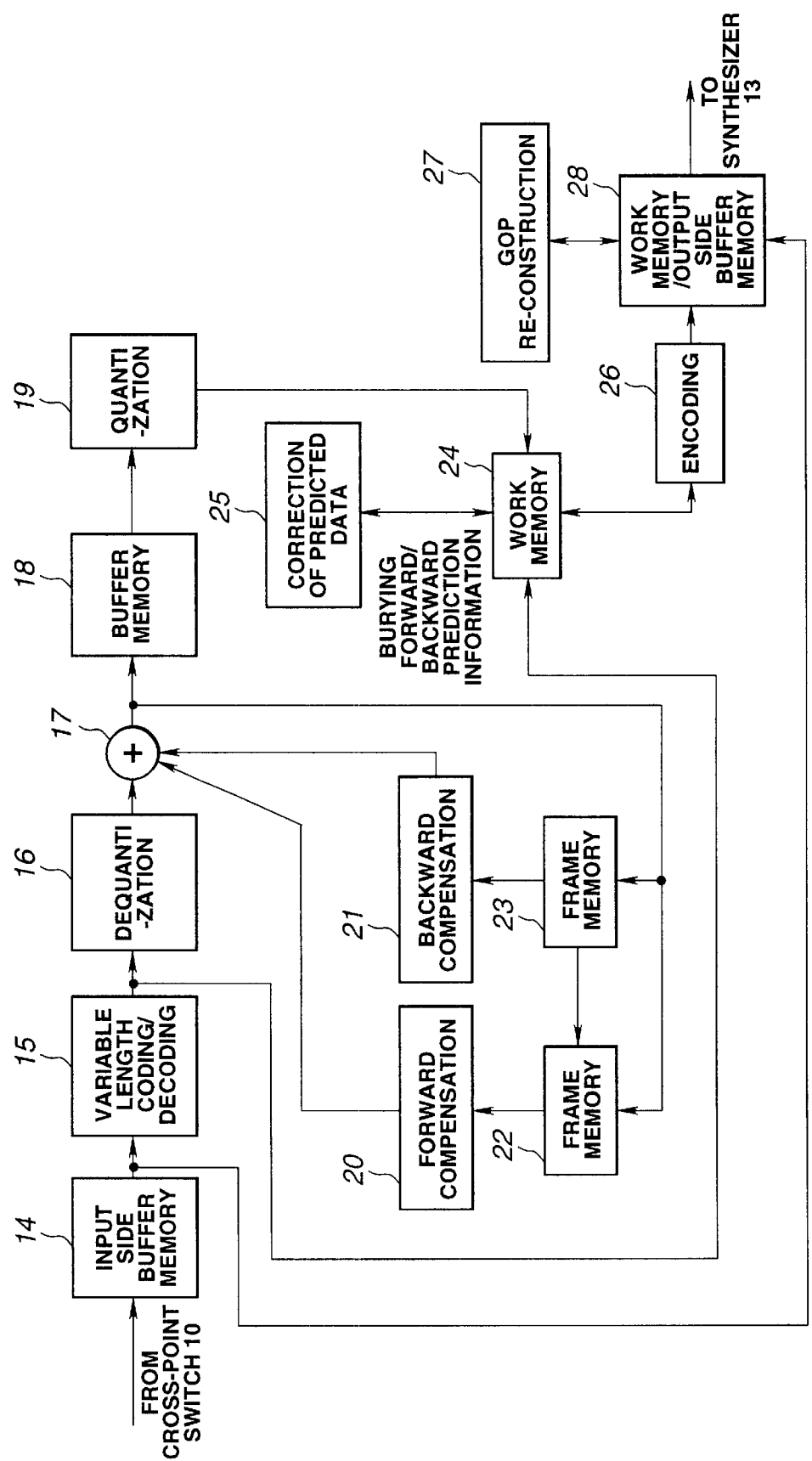
FIG. 4 is a block diagram showing a detailed structure of a GOP re-constricting unit of the matrix switcher shown in FIG. 3.

Referring to FIG. 4, the GOP re-constructing unit 11 or 12 includes an input side buffer memory 14, a variable length decoder 15, a dequantizer 16, an ader 17, a buffer memory 18, a quantizer 19, a forward compensation circuit 20, a backward compensation circuit 21, a frame memory 22, a frame memory 23, a work memory 24, a prediction data correction circuit 25, an encoder 26, a GOP assembling circuit 27 and a work memory/output side buffer memory 28.

The input buffer memory 14 transiently stores data of the encoded picture required for downstream side processing. The variable length decoder 15 decodes variable length encoded compressed data. The dequantizer 16 multiplies the picture data decoded by the variable length decoder 15 with a reciprocal of a quantization table for reversion to frequency-domain values. The forward compensation circuit 20 takes out picture data dequantized in the forward direction which is the same direction as the time flow from the frame memory 22 for re-constructing a picture. The backward compensation circuit 21 takes out picture data dequantized in the backward direction which is the reverse direction to the time flow from the frame memory 23 for re-constructing a picture. The adder 17 sums the re-constructed picture data outputted by the forward compensation circuit 20 and the backward compensation circuit 21 to the picture data which is the results of processing of the dequantizer 16. The buffer memory 18 transiently stores data for 1 GOP required for downstream-side processing. The dequantizer 19 multiplies the sum picture data taken out from the buffer memory 18 with discrete cosine transform values represented by coefficients of the quantization table and accommodates the ultimate total data volume within a pre-set constant value (reference data volume). The prediction data correction circuit 25 corrects the compressed B-frame picture data by addition/deletion of forward and backward prediction data. The work memory 24 corrects the compressed B-frame picture data, predicted by the prediction data correction circuit 25. The encoder 26 converts the quantized data to Huffman code and the run-length code. The GOP assembling circuit 27 has the functions of giving judgment as to whether or not the reference data volume is surpassed, decoding, re-quantization, Huffman table updating and encoding, and re-constructs and assembles a new GOP from the encoded data corrected by the prediction data correction circuit 25 and other data not in need of correction. The work memory/output side buffer memory 28 has the functions of a work area for assembling the GOP assembling circuit 27 and a memory for storage of if processed data results until a compact result set is obtained and outputted.

The operation of the matrix switcher 1, constructed as described above, is now explained. The cross-pint switch 10, shown in FIG. 3, selects two channels, for example, of compressed picture data supplied form plural external input devices, in accordance with instructions issued by the controller 7. When handling inter-frame compressed picture data, the cross-point switch 10 effects switching of selection at the trailing end of the GOP including the switched frame. The correct frame switching is carried out in the downstream side GOP re-constructing units 11, 12. In case of switching twp pictures into one continuous picture, the previously selected picture is termed an existing picture and a newly selected picture is termed a new picture. The existing picture is outputted after being passed through the GOP re-constructing unit 11 or 12 and the synthesis unit 13. Before switching, the GOP re-construction or synthesis is not required, so that the existing picture is simply passed through these components.

On reception of a switching command, the new picture is entered to the GOP re-constructing unit 11 or 12 not supplied with the existing picture. The existing picture is re-constructed to a new GOP terminating at a designated frame, while the new picture is re-constructed to a new GOP beginning with a designated frame. If synthesis unit 13 interconnects the pictures on the GOP basis to form a sole continuous picture.

The operation of the GOP re-constructing unit 11 or 12 is explained in detail with reference to FIGS. 4 to 11.

Referring to FIG. 4, a channel comprised of the input side buffer memory 14, variable length decoder 15, dequantizer 16, adder 17, buffer memory 18 and the quantizer 19, and a closed-loop channel, comprised of the adder 17, frame memories 23, 22, forward compensation circuit 20 and the backward compensation circuit 21, represent a path for generating an I-frame from a P-frame. For newly producing an I-frame, only the forward compensation circuit 20 is used, whereas, for forming a P-frame into an I-frame for correcting the prediction information for the B-frame, both the forward compensation circuit 20 and the backward compensation circuit 21 are used, as will be explained.

For generating an I-frame from a P-frame, it suffices if the previous I-frame is used to form the P-frame into an I-frame. The explanation is now given on how the P-frame is formed into an I-frame and on how the prediction information for the B-frame as later explained is corrected.

Figure 5A:
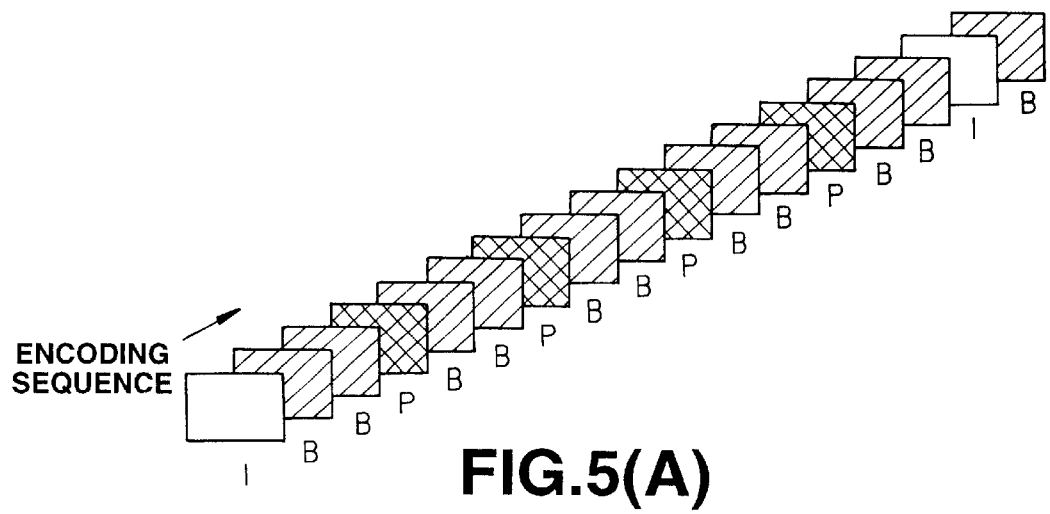
FIGS. 5A and 5B show the encoding sequence and the inputting sequence of the GOP, respectively.
Figure 5B:
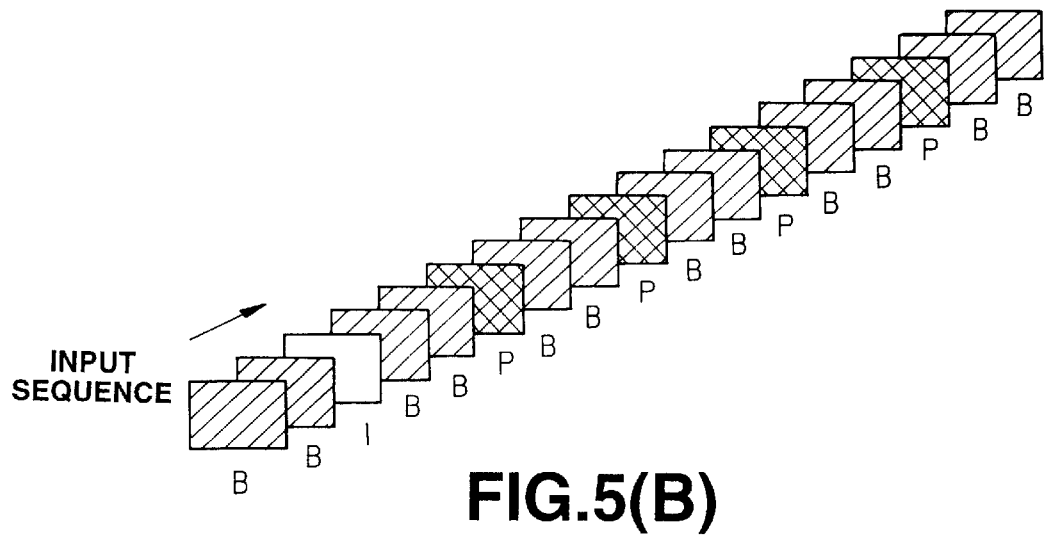

Each GOP has a sole I-frame and is made up of 15 frames, such as "IBBPBBPBBPBBPBB", as an example, as discussed above. The encoding sequence and the input sequence of the GOP frame queue are as shown in FIGS. 5A and 5B, respectively. Thus, the input sequence is "BBIBBPBBPBBPBBP". However, I and P are shifted forwards for encoding, so that I comes first, such that the encoding sequence becomes "IBBPBBPBBPBBPBB".

Figure 6:
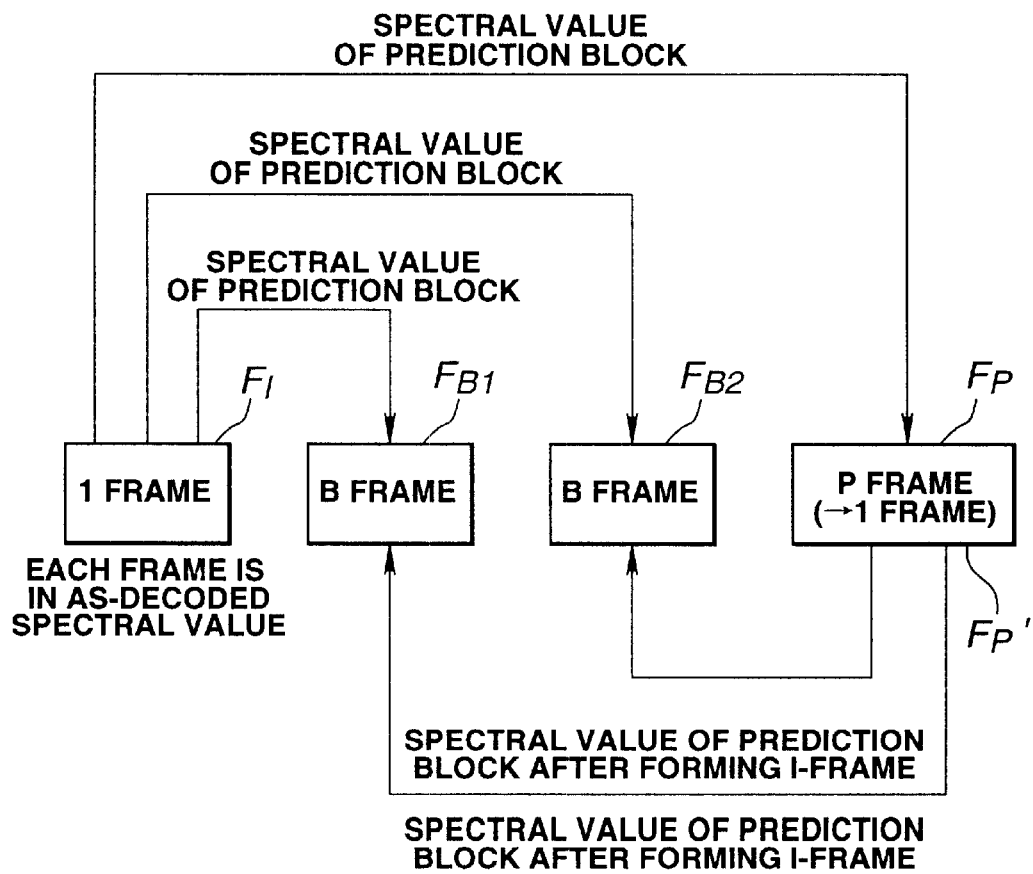
FIG. 6 shows an "IBBP" portion of the inputting sequence of the GOP shown in FIG. 5.
Figure 11:
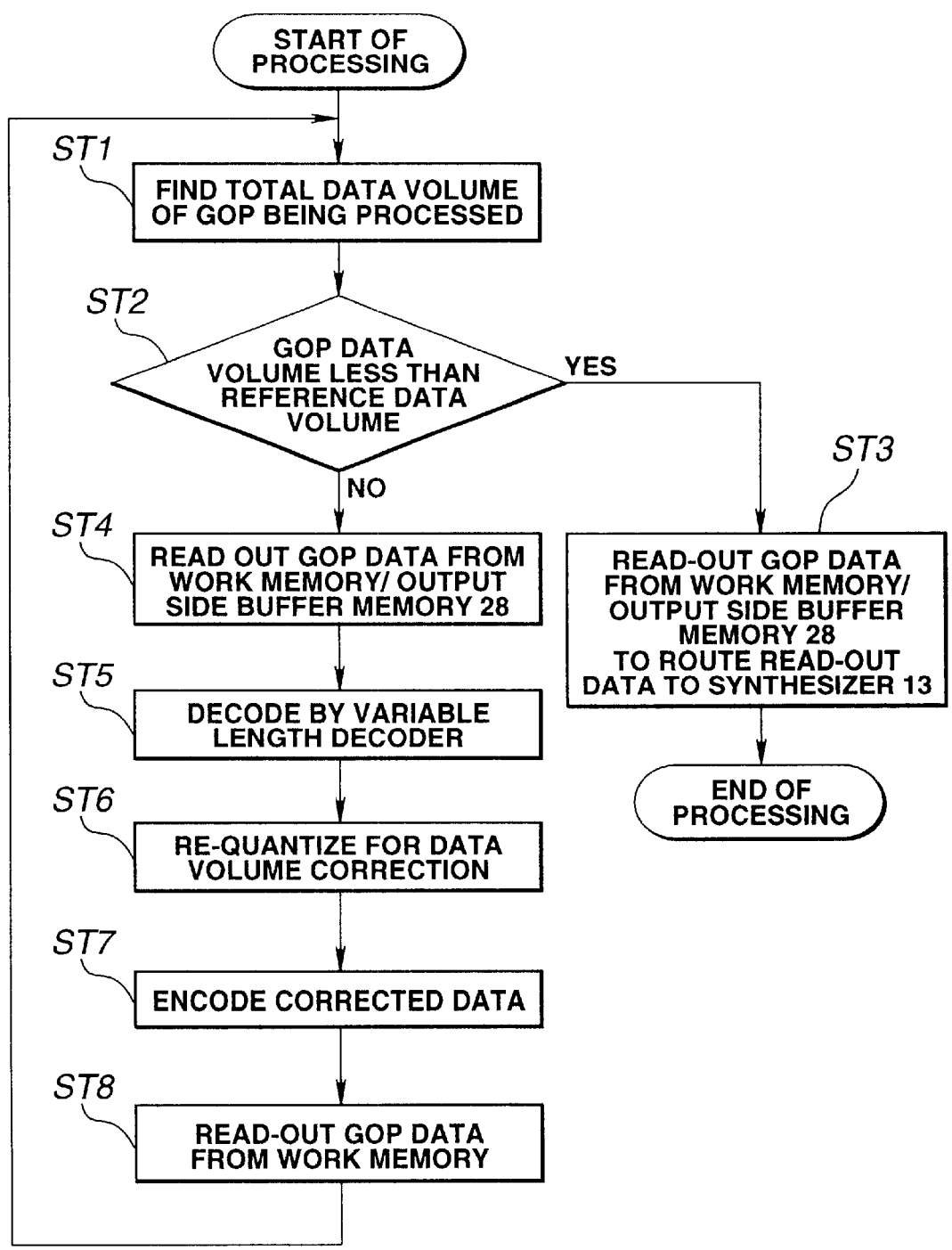
FIG. 11 illustrates data compression processing of the GOP re-constructing unit.
Figure 12:
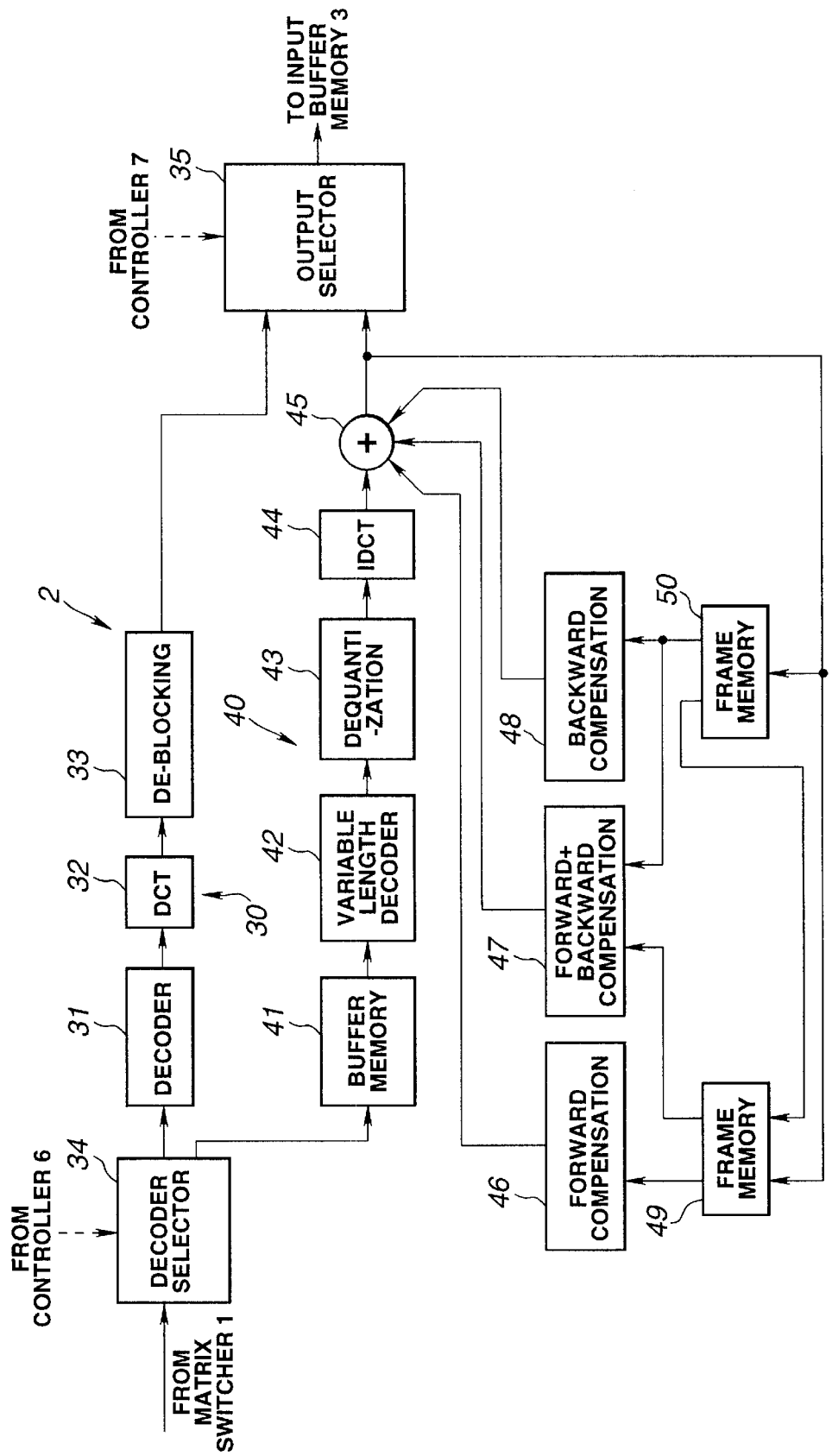
FIG. 12 is a block diagram showing a detailed structure of a decoder of the picture signal processing device shown in FIG. 2.

The GOP of the compressed picture data entered to the matrix switcher 1 has its encoding sequence of FIG. 5A decoded by the variable length decoder 15, and is arrayed in the input sequence of FIG. 5B. FIG. 6 shows a portion "IBBP" of the GOP arranged in this input sequence. Of course, the frames are arrayed from the left in the input sequence and is in the form of decoded frequency-domain spectral values.

The spectral values of the I-frame $F_I$ are summed to the spectral values of the block of a P-frame $F_P$ having a prediction vector. Each block is comprised of spectral values of 8×8=64 pixels. The prediction vector, which is a motion vector, has a relation of correspondence such that a block in the I-frame $F_I$ is the same as the a block of a P-frame $F_P$ within a certain tolerance, so that the block of the associated P-frame $F_P$ can be reproduced by bringing the block from the I-frame $F_I$. The P-frame can be converted into the I-frame by carrying out this operation for all blocks. The channel made up of the variable length decoder 15, work memory 24 and the prediction data correction circuit 25 corrects the B-frames $F_{B1}$ and $F_{B2}$ such as by burying the forward prediction information or the backward prediction information. If there are both the forward prediction information or the backward prediction information, only one suffices. This operation is carried out by the prediction data correction circuit 25. The B-frames $F_{B1}$ and $F_{B2}$ are corrected using the information of the frame $F_P'$ converted into the I-frame as described above. This is necessary for transferring the information required for B-frame reproduction before discarding the frame $F_P'$ converted into the I-frame. Specifically, the spectral values are moved from the frame $F_P'$ converted int the I-frame, based on the vector information, for eliminating the relation of inter-dependence among different frames. The P-frame $F_P$ is formed into the I-frame for two objectives. One is to convert the P-frame $F_P$, discarded for correcting the predictive information for the B-frames $F_{B1}$ and $F_{B2}$, while another is to create a new I-frame $F_P'$ from the P-frame $F_P$ for discarding the U-frame $F_I$. The spectral values of the prediction block are supplied from the I-frame $F_1$ to the B-frames $F_{B1}$ and $F_{B2}$ by the expansion operation. There are two sorts of the prediction information for the F-frame or the B-frame, namely the information obtained on differentiation followed by quantization, using the motion vector, and the information not employing the motion vector. The correction of the prediction information of the B-frames $F_{B1}$ and $F_{B2}$ becomes necessary when discarding the I-frame or the P-frame $F_P$. As for the I-frame $F_I$ or the P-frame $F_P$, there are original data (information not employing the motion vector), so that these need to be buried in the B-frame $F_{B1}$ and $F_{B2}$. This is why the information obtained on differentiation followed by quantization, using the motion vector, is corrected to the information not employing the motion vector. The P-frame does not necessarily own original data so that, in the worst case, it may become necessary to race back to the I-frame. In this manner, the GOP re-constructing units 11, 12 convert the P-frame into the I-frame and correct the prediction information of the B-frame.

The GOP re-constructing units 11, 12 the GOP frame queue having the encoding sequence of "IBBPBBPBBPBBPBB" as shown in FIGS. 7A to 7I and in FIGS. 8A to 8I depending on the difference in the switching position. The GOP re-constructing units 11 and 12 re-construct the existing picture and the new picture as shown in FIGS. 7A to 7I and in FIGS. 8A to 8I, respectively. In addition, the GOP re-constructing units 11 and 12 re-construct the GOP frame queue made up only of I- and B-frames without having P-frames, namely a GOP frame queue "IBBBIBBBIBBBIBBB", as shown in FIGS. 9A to 9I and in FIGS. 10A to 10I, respectively, depending on the difference in the switching position. It is noted that the GOP re-constructing units 11 and 12 re-construct the existing picture and the new picture as shown in FIGS. 9A to 9I and in FIGS. 10A to 10I, respectively.

In the example of GOP re-construction, shown in FIGS. 7A to 7I and in FIGS. 8A to 8A, the P-frames of the existing picture are discarded and the backward prediction information is added to the B-frame, while the P-frames of a new picture are converted to I-frames and the forward prediction information is added to the B-frame. In the processing of the existing pictures, the P-frame next to the previous I-frame is converted into an I-frame. This operation is sequentially repeated until the P-frame under consideration is converted into an I-frame which then is used for correcting the prediction information for the B-frame. In processing the new picture, the P-frame under consideration is converted into an I-frame and the prediction information for the B-frame is corrected using the information of the previous I-frame.

In the example of GOP re-construction shown in FIGS. 9A to 9I and in FIGS. 10A to 10I, there is no P-frame, so that there is no necessity of preparing an I-frame from the P-frame. However, for correcting the B-frame, one frame is brought to the work memory 24 by a pass of generating the I-frame from the P-frame.

The data of the processed frame is routed from the work memory 24 to the encoder 26 for conversion into Huffman code and the run-length code. The resulting encoded data is entered to the work memory/output side buffer memory 28. An output of the input side buffer memory 14 is also fed to the work memory/output side buffer memory 28. The data directly supplied from the input side buffer memory 14 is unprocessed data that need not be processed in the GOP re-construction. Output data of the work memory/output side buffer memory 28 is entered to the GOP assembling circuit 27. The GOP assembling circuit combines the processed frame data and the unprocessed frame data to produced a new GOP. The frame information, which has become unnecessary, is discarded. Alternatively, the frame information can be discarded selectively by an output of the input side buffer memory 14.

Two examples of the above-described operations, performed by the GOP re-constructing units 11, 12, are explained by referring to FIGS. 7A to 7I and FIGS. 8A and 8I.

FIG. 7A shows the latter portion f, d, h, i, g, k, l, j, n, o and m of the input sequence frame queue of the GOP of the existing picture and switching positions $S_1$, $S_2$, $S_3$, $S_4$, $S_5$, $S_6$, $S_7$ and $S_8$, where d, g, j and m denote P-frames and f, h, i, k, l, n and o denote B-frames. The switching at the switching positions $S_1$, $S_2$, $S_3$, $S_4$, $S_5$, $S_6$, $S_7$ and $S_8$ is commanded by the controller 7. FIGS. 7A to 7I show the manner of re-construction performed by the GOP re-constructing unit 11 in case the switching positions $S_1$, $S_2$, $S_3$, $S_4$, $S_5$, $S_6$, $S_7$ and $S_8$ is commanded. Since the g-frame, which is the P-frame, needs to be previously known for encoding h and i frames, which are B-frames, and hence the g-frame is encoded prior to the h and i frames, the basic encoding sequence for the GOP is such a sequence in which the g-frame, which is the P-frame, is moved to the position of the previous P-frame. The same applies for the frames j and m which are P-frames.

If the switching position $S_2$ is shown as shown in FIG. 7A by the command from the controller 7, the GOP re-constructing unit 11 performs GOP-based switching, without specifically modifying the above-mentioned basic encoding sequence, as shown in FIG. 7B.

If the switching position $S_2$ is indicated, the GOP re-constructing unit 11 adds the backward prediction information of the of the m-frame, which is the P-frame, to the frames n and o, which are B-frames, of the frame queue arranged in the basic encoding sequence, for correcting the frames n and o to n' and O'. The frame m is then discarded. The purpose of adding the backward prediction information is to delete the vector information accorded by the frame m from the frames n and o by adding the actual block picture information to the frames n and o, which are B-frames. The block picture information of the P-frame is obtained on discrete cosine transform of the differential value between the I-frame and the P-frame or the P-frame value. In discrete cosine transforming the difference between the I-frame and the P-frame, it is necessary to re-construct the m picture, which is the P-frame under consideration, from the previous I-frame and P-frame in the GOP. That is, all frames in the GOP up to the P-frame required for addition of the prediction information of the B-frame are transiently converted into an I-frame.

If the switching position $S_5$ is specified, the GOP re-constructing unit 11 adds the backward prediction information of the frame m, which is the P-frame, to the frame n, which is the B-frame, in the frame queue, arranged in the above-mentioned basic encoding sequence, to correct the frame n to a frame n', before discarding the frames o' and m, as shown in FIG. 7D.

If the switching position $S_4$ is specified, the GOP re-constructing unit 11 discards the frames n, m and o of the frame queue, arranged in the above-mentioned basic encoding sequence, as shown in FIG. 7E.

If the switching position $S_5$ is specified, the GOP re-constructing unit 11 adds the backward prediction information of the frame j, which is the P-frame, to the frames k and l, which are B-frames, in the frame queue, arranged in the above-mentioned basic encoding sequence, to correct the frames k and l to frames k' and l', before discarding the frames j, n, o and m, as shown in FIG. 7F.

If the switching position $S_6$ is specified, the GOP re-constructing unit 11 adds the backward prediction information of the frame j, which is the P-frame, to the frame k, which is the B-frame, in the frame queue, arranged in the above-mentioned basic encoding sequence, to correct the frame k to a frame k', before discarding the frames l, j, n, o and m, as shown in FIG. 7G.

If the switching position $S_7$ is specified, the GOP re-constructing unit 11 discards the frames k, l, j, n, m and o of the frame queue, arranged in the above-mentioned basic encoding sequence, as shown in FIG. 7H.

If the switching position $S_8$ is specified, the GOP re-constructing unit 11 adds the backward prediction information of the frame g, which is the P-frame, to the frames h and i, which are B-frames, in the frame queue, arranged in the above-mentioned basic encoding sequence, to correct the frames h and j to frames h' and j', before discarding the frames g, k, l, j, n, m and o, as shown in FIG. 7I.

FIG. 8A shows the former half b, c, a, e, f, d, h, i, g and k of the input sequence frame queue of the GOP of the new picture and the switching positions $s_1$, $s_2$, $s_3$, $s_4$, $s_5$, $s_6$, $s_7$ and $s_8$, where a is an I-frame, g, g and j are I-frames and b, c, e, f, h, i and k are B-frames. The switching at the switching positions $s_1$, $s_2$, $s_3$, $s_4$, $s_5$, $s_6$, $s_7$ and $s_8$ is commanded by the controller 7. FIGS. 8B to 8I illustrate there-constriction processing performed by the GOP re-constructing unit 12 for the switching positions $s_1$, $s_2$, $s_3$, $s_4$, $s_5$, $s_6$, $s_7$ and $s_8$. The basic GOP encoding sequence is such a sequence in which the frame a, which is an I-frame, and frames d, g and j, which are P-frames, are shifted to the positions of the original I-frame or the P-frame so that the frame a, which is the I-frame, will be the leading frame.

If the switching position s, is specified under instructions by the controller 7, as shown in FIG. 8B, the GOP re-constructing unit 12 performs GOP-based switching, without specifically modifying the encoding sequence, as shown in FIG. 8B.

If the switching position $s_2$ is specified, the GOP re-constructing unit 11 discards the frame b, which is the B-frame of the frame queue, arranged in the above-mentioned basic encoding sequence, as shown in FIG. 8C.

If the switching position $s_3$ is specified, the GOP re-constructing unit 11 discards the frames b and c, which are B-frames of the frame queue, arranged in the above-mentioned basic encoding sequence, as shown in FIG. 8D.

If the switching position $s_4$ is specified, the GOP re-constructing unit 11 converts the frame d, which is the P-frame, of the frame queue arranged in the basic encoding sequence, and adds the forward prediction information of the frame a, which is the I-frame, to the frames e and f, which are B-frames, to correct the frames e and f to e' and f', respectively, before discarding the frames a, b and c, as shown in FIG. 8E. The purpose of adding the forward prediction information is to delete the vector information accorded by the frame a from frames e and f by adding the actual picture information to the frames e and f.

If the switching position $s_5$ is specified, the GOP re-constructing unit 11 converts the frame d, which is the P-frame, of the frame queue arranged in the basic encoding sequence, and adds the forward prediction information of the frame a, which is the I-frame, to the frames e and f, which are B-frames, to correct the frames e and f to e' and f', respectively, before discarding the frames a, b, c and e, as shown in FIG. 8F.

If the switching position $S_6$ is specified, the GOP re-constructing unit 11 converts the frame d, which is the P-frame, of the frame queue arranged in the basic encoding sequence, into an I-frame, and discards the frames a, b, c, e and f, as shown in FIG. 8G.

If the switching position $S_7$ is specified, the GOP re-constructing unit 12 converts the frame g, which is the P-frame, of the frame queue arranged in the basic encoding sequence, into an I-frame, and adds the forward prediction information of the frame d to the frames h and i to correct the frames h and i to h' and i', respectively, before discarding the frames a, b, c, d, e and f, as shown in FIG. 8H.

If the switching position $s_8$ is specified, the GOP re-constructing unit 12 converts the frame g, which is the P-frame, of the frame queue arranged in the basic encoding sequence, into an I-frame, and adds the forward prediction information of the frame d to the frame i to correct the frame i to i', before discarding the frames a, b, c, d, e, f and h, as shown in FIG. 8I.

In this manner, the GOP re-constructing units 11, 12 independently re-construct the existing picture and the new picture, respectively. The synthesis unit 13 synthesizes the pictures on the GOP basis to produce a sole continuous picture.

FIG. 9A shows latter portion h, e, j, l, i, o, p, q and m of the input sequence frame queue of the GOP of the existing pictures and switching positions $S_1, S_2, S_3, S_4, S_5, S_6, S_7$ and $S_8$, where e, i and m are I-frames and h, j, k, l, o, p and q are B-frames. The switching at the switching positions $S_1, S_2, S_3, S_4, S_5, S_6, S_7$ and $S_8$ is specified by the command by the controller 7. FIGS. 9B to 9I illustrate GOP re-construction carried out by the GOP re-constructing unit 11 for the switching positions $S_1, S_2, S_3, S_4, S_5, S_6, S_7$ and $S_8$. The basic GOP encoding sequence is such a sequence in which the frames e, i and m, which are I-frames, are shifted to the positions of the previous I-frames.

If the switching position $S_1$ is specified under instructions by the controller 7, as shown in FIG. 9A, the GOP re-constructing unit 11 performs GOP-based switching, without specifically modifying the basic encoding sequence, as shown in FIG. 9B.

If the switching position $S_2$ is specified, the GOP re-constructing unit 11 adds the backward prediction information of the frame m, which is the I-frame, to the frames o, p and q, which are B-frames, in the frame queue arranged in the above-mentioned basic encoding sequence, to correct the frames o, p and q to o', p' and q', respectively, before discarding the frame m, as shown in FIG. 9C.

If the switching position $S_3$ is specified, the GOP re-constructing unit 11 adds the backward prediction information of the frame m, which is the I-frame, to the frames o and p, which are B-frames, of the frame queue arranged in the above-mentioned basic encoding sequence, to correct the frames o and p to o' and p', respectively, before discarding the frames m and q, as shown in FIG. 9D.

If the switching position $S_4$ is specified, the GOP re-constructing unit 11 adds the backward prediction information of the frame m, which is the I-frame, to the frame o, which is the B-frame, in the frame queue arranged in the above-mentioned basic encoding sequence, to correct the frame o to o', respectively, before discarding the frames m, p and q, as shown in FIG. 9E.

If the switching position $S_5$ is specified, the GOP re-constructing unit 11 discards the frames o, p, q and m of the frame queue arranged in the above-mentioned basic encoding sequence, s shown in FIG. 9F.

If the switching position $S_8$ is specified, the GOP re-constructing unit 11 adds the backward prediction information of the frame i, which is the I-frame, to the frames j, k and l, which are B-frames, in the frame queue arranged in the above-mentioned basic encoding sequence, to correct the frames j, k and l to j', k' and l', respectively, before discarding the frames i, o, p, q and m, as shown in FIG. 9G.

If the switching position $S_7$ is specified, the GOP re-constructing unit 11 adds the backward prediction information of the frame i, which is the I-frame, to the frames j and k, which are B-frames, in the frame queue arranged in the above-mentioned basic encoding sequence, to correct the frames j and k to j' and k', respectively, before discarding the frames l, i, o, p, q and m, as shown in FIG. 9H.

If the switching position $S_8$ is specified, the GOP re-constructing unit 11 adds the backward prediction information of the frame i, which is the I-frame, to the frame j, which is a B-frame, in the frame queue arranged in the above-mentioned basic encoding sequence, to correct the frame j to j', before discarding the frames k, l, i, o, p, q and m, as shown in FIG. 9I.

FIG. 10A shows former portion b, c, d, a, f, g, h, e, j and k of the input sequence frame queue of the GOP of the new picture and switching positions $s_1, s_2, s_3, s_4, s_5, s_6, s_7$ and $s_8$, where a and e are I-frames and b, c, d, f, g, h, j and k are B-frames. The switching at the switching positions $s_1, s_2, s_3, s_4, s_5, s_6, s_7$ and $s_8$ is specified by the command by the controller 7. FIGS. 10B to 10I illustrate GOP re-construction carried out by the GOP re-constructing unit 12 for the switching positions $s_1, s_2, s_3, s_4, s_5, s_6, s_7$ and $s_8$. The basic GOP encoding sequence is such a sequence in which the frames a, e and i, which are I-frames, are shifted to the positions of the previous I-frames.

If the switching position $s_1$ is specified under instructions by the controller 7, as shown in FIG. 10B, the GOP re-constructing unit 12 performs GOP-based switching, without specifically modifying the encoding sequence, as shown in FIG. 10B.

If the switching position $s_2$ is specified, the GOP re-constructing unit 12 discards the frame b, which is the B-frame of the frame queue arranged in the basic encoding sequence, as shown in FIG. 10C.

If the switching position $s_3$ is specified, the GOP re-constructing unit 12 discards the frames b and c, which are B-frames, of the frame queue arranged in the basic encoding sequence, as shown in FIG. 10D.

If the switching position $s_4$ is specified, the GOP re-constructing unit 12 discards the frames b, c and d, which are B-frames, of the frame queue arranged in the basic encoding sequence, as shown in FIG. 10E.

If the switching position $s_5$ is specified, the GOP re-constructing unit 12 adds the forward prediction information of the frame a, which is the I-frame, to the frames f, g and h, which are B-frames, of the frame queue arranged in the basic encoding sequence, to correct the frames f, g and h to f', g' and h', respectively, before discarding the frames b, c, d and a, as shown in FIG. 10F.

If the switching position $s_6$ is specified, the GOP re-constructing unit 12 adds the forward prediction information of the frame a, which is the I-frame, to the frames g and h, which are B-frames, of the frame queue arranged in the basic encoding sequence, to correct the frames g and h to g' and h', respectively, before discarding the frames b, c, d, a and f, as shown in FIG. 10G.

If the switching position $s_7$ is specified, the GOP re-constructing unit 12 adds the forward prediction information of the frame a, which is the I-frame, to the frame h, which is a B-frame, of the frame queue arranged in the basic encoding sequence, to correct the frame h to h', before discarding the frames b, c, d, a, f and g, as shown in FIG. 10H.

If the switching position $s_8$ is specified, the GOP re-constructing unit 12 discards the frames b, c, d, a, f, g and h, which are B-frames of the frame queue arranged in the basic encoding sequence, as shown in FIG. 10I.

The GOP re-constructing units 11, 12 independently re-construct the existing picture and the new picture, respectively. The synthesis unit 13 synthesizes the pictures on the GOP basis to produce a sole continuous picture.

As the GOP re-structuring in the GOP re-constructing units 11, 12 proceeds, it is a frequent occurrence that the total GOP data volume exceeds a reference data volume which is a pre-set total data volume. In this case, the GOP assembling unit 27 performs data compression processing for accommodating the total data volume made up of the unprocessed fame data and the processed frame data within a reference data volume. The data compression processing by the GOP assembling unit 27 is now explained by referring to the flowchart of FIG. 11.

First, at step ST1, the GOP assembling unit 27 calculates the total GOP data volume stored in the work memory/output buffer memory 28. It is then judged at step ST2 whether or not the total data volume of the GOP as calculated is less than the pre-set reference data volume. The reference data volume is varied with the number of frames making up the GOP. If the total data volume of the GOP is less than the pre-set reference data volume, the GOP assembling unit 27 transfers to step ST3 to read out the total GOP data from the work memory/output buffer memory 28 to send the read-out data to the downstream side synthesis unit 13. After completion of the processing of step SR3, the data compression processing of the GOP assembling unit 27 comes to a close.

However, if the total data volume of the GOP is judged to be larger than the pre-set reference data volume, the GOP assembling unit 27 transfers to step ST4 to read out the total GOP data from the work memory/output buffer memory 28. The GOP assembling unit 27 then decodes at step ST5 the total GOP data thus read out by the variable length decoder. The GOP assembling unit 27 then re-quantizes the decoded GOP data at step ST6 so that the total GOP data volume will be not more than the reference data volume for correcting the data volume. The GOP assembling unit 27 then encodes at step ST7 the GOP data corrected as to the data volume to return the encoded data to the work memory/output buffer memory 28. The GOP assembling unit 27 then reads out at step ST8 the re-quantized GOP data from the work memory/output buffer memory 28.

The total data volume of the GOP data read out at step ST8 is calculated at step ST1. It is then judged at step ST2 whether or not the data volume is not more than the reference data volume. If the result of check at step ST2 is YES, the GOP data is supplied at step ST3 to the synthesis unit 13. If the result of check at step ST2 is NO, the processing from step ST4 to step ST8 is repeated.

The re-quantization of step ST6 decreases the number of allocated bits by multiplying the coefficients of the quantization table used in the quantizer 19 with weighting coefficients for reducing the number of allocated bits. This re-quantization is carried out for all of the I-, P- and B-frames. The weighting coefficient is the reference data volume divided by the total data volume multiplied by a constant which is set so that the volume of the encoded data will not exceed the reference data volume.

For accommodating the total GOP data volume within the reference data volume, there may be provided a Huffman table updating function of the encoder 26 for prohibiting the reference data from being exceeded on encoding.

Thus the matrix switcher 1 can switch inter-frame compressed pictures correctly at a designated frame. In addition, the compressed picture after switching does not affect expansion processing. The phase coincidence of the GOP of the switched picture is not required. The GOP information volume of the picture after switching synthesis can be prevented from being increased. On the other hand, picture expansion is not required, while cut editing is also possible.

The picture signal processing device of the present embodiment can restore the compressed picture data, connected as described above by the matrix switcher 1, to an original picture by the decoder 2 shown in FIG. 2. The decoder 2 has the function of separating the picture signals, speech signals and the attribute information thereof from the input signals and the communication function with the controller 7, in addition to the function of restoring the compressed picture to the original picture.

The attribute information is the information specifying the properties or characteristics of the signal. In case the signal is a picture signal, the attribute information includes the compression/non-compression discrimination information, information on the compression system, the information on the picture size dependent on the number of pixels in the horizontal and vertical directions, the information on the size of the processing screen designating a processing area, such as the information on the picture system, e.g., NTSC, PAL or RGB, or the input/output signal rate information. This attribute information can be accorded via controller 7 to the decoder 2.

Specifically, the decoder 2 expands the compressed picture signals from the external input device as it varies the expansion method in accordance with instructions by the controller 7. The picture set to the non-compressed state by the compression/non-compression discrimination information of the attribute information and that need not be expanded is by-passed without compression.

The decoder 2 includes a decoding unit 31 for decoding, such as Huffman decoding, an IDCT circuit 32 and a deblocking circuit 33. Specifically, the decoder 2 includes a JPEG decoder 30 for decoding the picture compressed by the encoding method standardized by JPEG, and an MPEG decoder 40 having a buffer gal memory 41, a variable length decoder 42, a dequantizer 43, an IDCT circuit 44, an adder 45, a forward compensation circuit 46, a forward-backward compensation circuit 47, a backward compensation circuit 48, a frame memory 49 and a frame memory 50. The MPEG decoder 40 decodes a picture compressed by the encoding method standardized by MPEG.

On the input side of the JPEG decoder 30 and the MPEG decoder 40 is provided a decoder selector 34 for selecting through which decoder data should be passed. On the output side of the JPEG decoder 30 and the MPEG decoder 40 is provided an output selector 35.

The decoding unit 31 of the JPEG decoder 30 decodes Huffman encoded data, as an example. The IDCT circuit 32 performs inverse DCT on the decoded data. The deblocking circuit 33 restores the blocked data to give a sole picture.

The buffer memory 41 of the MPEG decoder 40 temporarily stores data required for downstream side decoding. The variable length decoder 42 decodes variable length encoded data. The dequantizer 43 multiplies output data of the variable length decoder 42 with a quantization number for restoration to a frequency-domain value. The IDCT circuit 44 performs IDCT on output data of the dequantizer 43. The forward compensation circuit 46 takes out picture data in the forward direction which is the same direction as the time flow from the frame memory 49 for re-constructing a picture. The backward compensation circuit 48 takes out picture data in the backward direction which is the reverse direction to the time flow from the frame memory 50 for re-constructing a picture. The forward-backward compensation circuit 47 takes out the picture information of both directions from the frame memories 49, 50 to re-construct the picture. The adder 45 sums the re-constructed picture data outputted by the forward compensation circuit 46, forward-backward compensation circuit 47 and the backward compensation circuit 48 to the picture data which is the results of processing by the IDCT circuit 44. The expansion processing by the decoder 2 is parametric for receiving a picture of an arbitrary size in terms of, for example, 8×8 pixel block as a unit, such that a picture of a designated size can be expanded in accordance with the picture size information of the attribute information. In case of a picture of 8×8 pixel block with a fractional number, dummy data is added to give a picture size free of fractional number for processing.

The input buffer memory unit 3 has the function of converting the picture signals into, for example, component signals and converting the transfer rate of the picture signals, in addition to the function of having communication with the controller 7.

Figure 13:
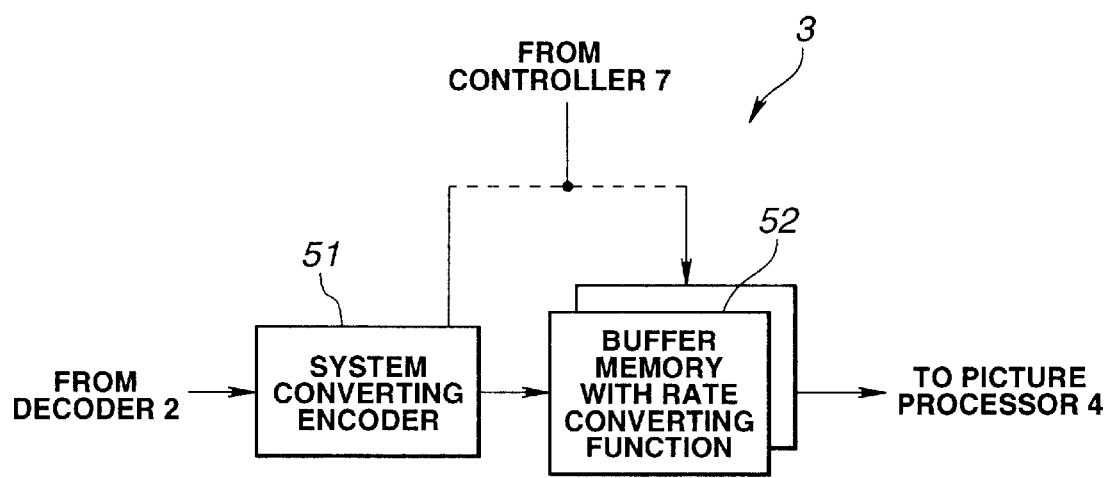
FIG. 13 illustrates a detailed structure of an input buffer memory of the picture signal processing device shown in FIG. 2.
Figure 14:
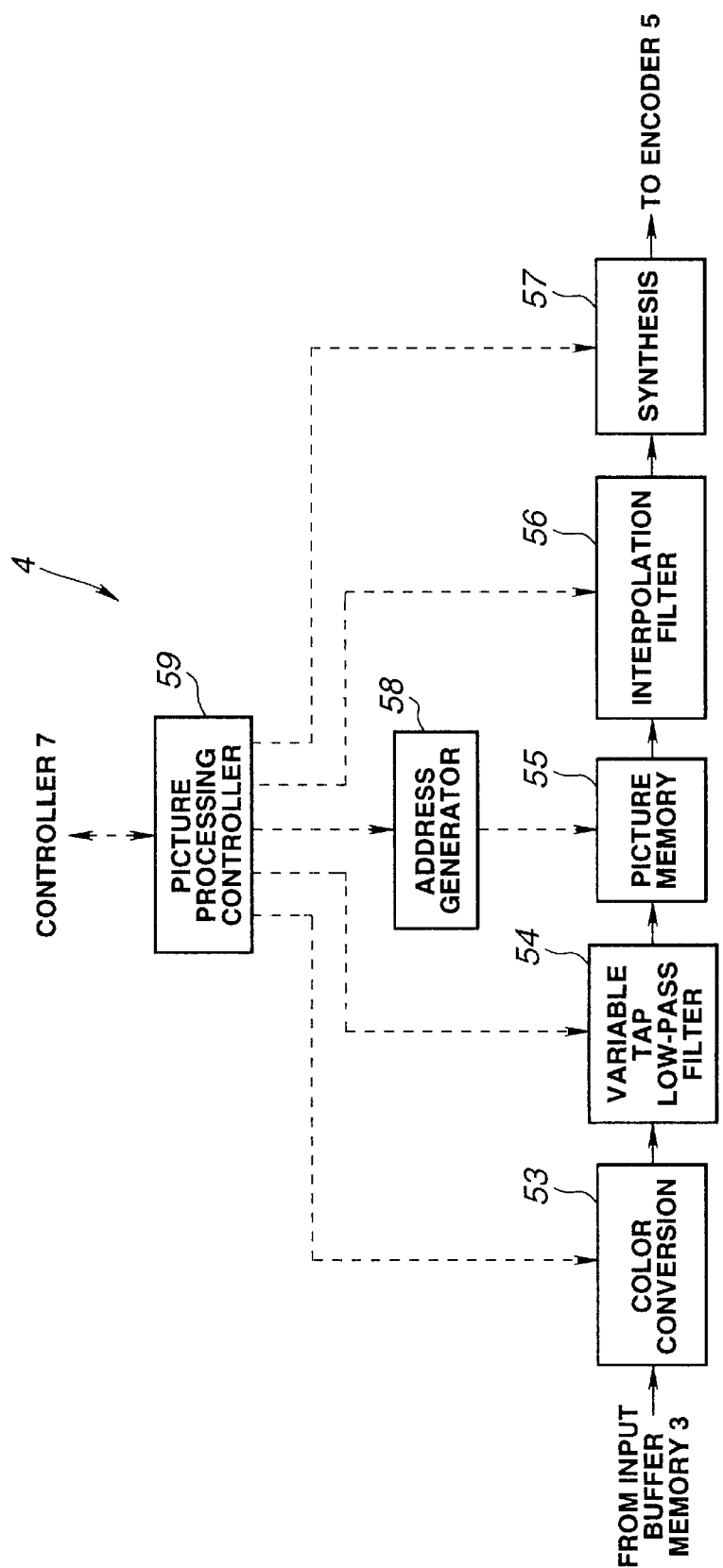
FIG. 14 illustrates a detailed structure of a picture processing unit of the picture signal processing device shown in FIG. 2.

The input buffer memory 3 is made up of a system conversion encoder 51 and a buffer memory with a rate conversion function 52, as shown in FIG. 13. The system conversion encoder 51 effects conversion into Y, R-Y, G-Y signals or R, G and B component signals handled as internal processing of the present device. This system conversion is processed in accordance with the picture size information and the picture system information of the attribute information accorded by the controller 7. However, the composite signals or Y/C signals may directly be used for simple frame switching, so that conversion into component signals may be eliminated.

The buffer memory with a rate conversion function 52 has a sufficient capacity irrelevant to the picture size of the picture signals. The writing into the buffer memory with a rate conversion function 52 is at an input rate to the buffer memory 52, while readout therefrom is at an output rate of the system conversion encoder 51. If the readout rate is higher than the write rate, a queuing state is set during readout. That is, the buffer memory with a rate conversion function 52 is made up of two memories, of which one acts as a readout memory when the other acts as a write memory. The readout and write roles become prevalent alternately. That is, the buffer memory with a rate conversion function 52 has the double buffer memory structure. These two memories own independently operating address generators. The input rate used accords with the picture input/output rate information supplied from the controller 7. The address generators provided in the respective memories generate addresses. By adjusting the size of the address generating block and the block address interval, the inputs of various rates can be converted into input rates of the processing system. In the present embodiment, since the picture data is handled on the block basis, the above rate is the time average rate.

The picture processing unit 4 has the function of having communication with the controller 7, in addition to the picture processing functions, such as picture synthesis, picture generation, painting or special effect.

The picture processing unit 4 is made up of a color conversion circuit 53, a variable tap low-pass filter 54, a picture memory 55, an interpolation filter 56, a synthesis circuit 57, an address generator 58 and a picture processing controller 59.

The color conversion circuit 53 varies the colors of the pixels of the picture in accordance with instructions by the picture processing controller 59. In general, each color is composed of three colors of R, G and B or Y, R-Y and B-Y, such that color conversion can be achieved by varying the mixing ratio of the three colors. The variable tap low-pass filter 54 has the function of a low-pass filter for performing anti-aliasing prior to contraction processing. Since tap coefficients of the variable tap low-pass filter 54 can be changed in accordance with instructions of the picture processing controller 59, the effective low-pass range can be varied depending on the degree of contraction. The above-mentioned low-pass filtering function is also used for blurring termed defocusing as one of the special effects. The picture memory 55 is a working memory for effecting coordinate transformation termed geometry transformation. The addresses for transformation are generated by the address generator 58. The interpolation filter 56 has the interpolating function of padding void pixels generated on coordinate transformation with ambient pixel values. The synthesis circuit 57 synthesizes plural processed pictures. The address generator 58 generates addresses for geometry transformation of a picture on the picture memory 55. The picture processing controller 59 issues control signals to the color conversion circuit 53, variable-tap low-pass filter 54, address generator 58, interpolation filter 56 and to the synthesis circuit 57 for instructing the processing. This picture processing controller 59 is fed with a control signal from the controller 7.

The picture processing range or the memory area in which to store the picture are set by the processing screen size information of the attribute information sent from the controller 7 and parameters conforming to the picture size information. This enables a picture of an arbitrary size to be processed with an optional screes size.

The encoder 5 encodes the picture as the encoding method is changed in accordance with instructions from the controller 7, while by-passing a picture not in need of compression. The encoder 5 changes the above-mentioned component-based picture system to the output picture system in keeping with the picture system information of the attribute information supplied from the controller 7 by the above-mentioned picture system converting function. Since this picture system change is dealt with in accordance with the picture size information of the attribute information supplied from the controller 7, any optional picture can be dealt with. The transmission of the attribute information is by the communication function with the controller 7.

Figure 15:
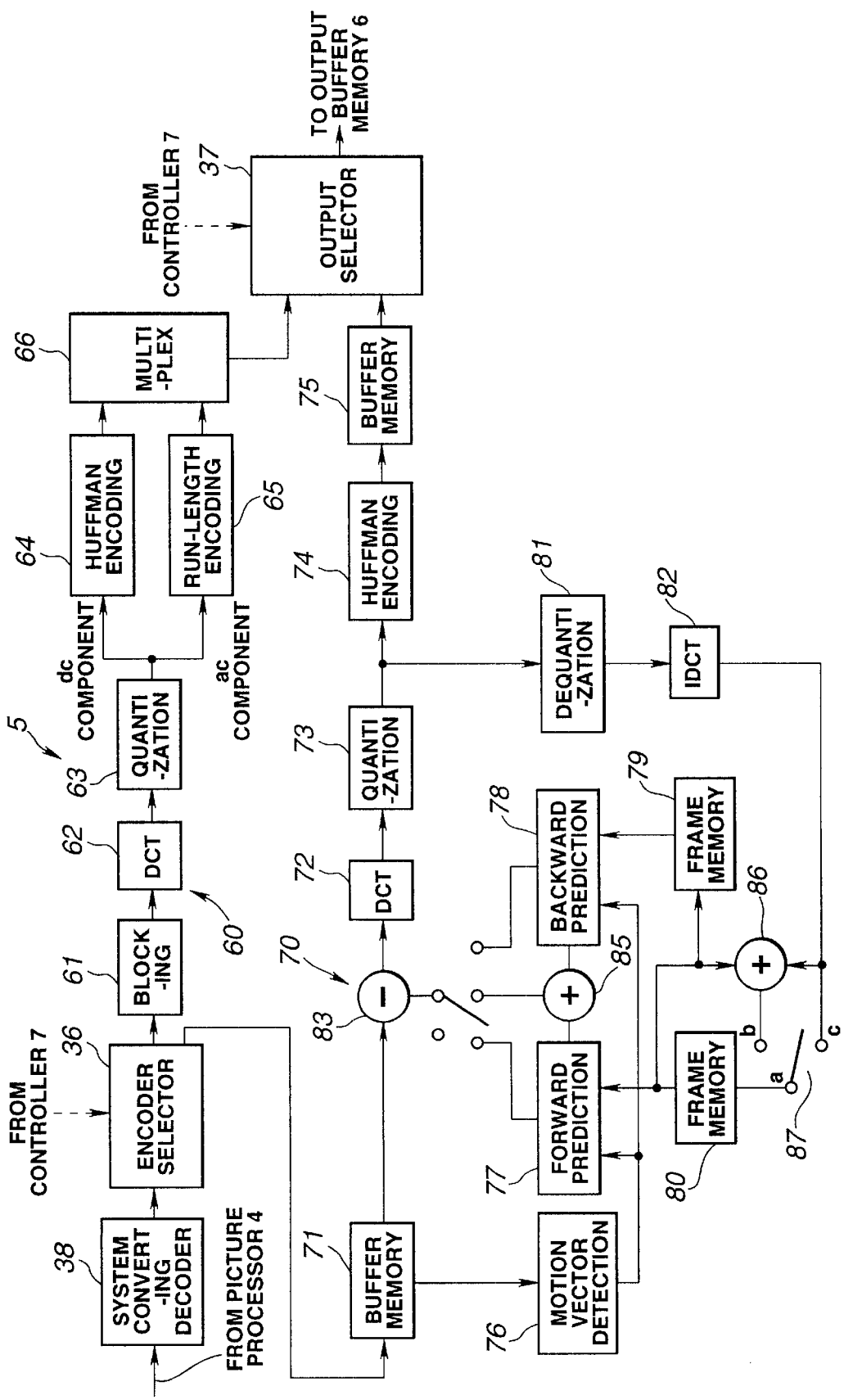
FIG. 15 is a block diagram showing a detailed structure of an encoder of the picture signal processing device shown in FIG. 2.

Similarly to the decoder 2, the encoder 5 is made up of two channels, namely a JPEG encoder 60 and an MPEG encoder 70, as shown in FIG. 15. These two channels are branched at an encoder selector 36 and again unified at an output selector 37. Upstream of the encoder selector 36 is provided a system conversion decoder 38 for executing the picture system conversion function.

The JPEG encoder 60 is made up of a blocking circuit 61, a DCT circuit 62, a quantizer 63, a Huffman encoder 64, a run-length encoder 65 and a multiplexer circuit 66.

The MPEG encoder 70 is made up of a buffer memory 71, a DCT circuit 72, a quantizer 73, a Huffman encoder 74, a buffer memory 75, a motion vector detection circuit 76, a forward prediction circuit 77, a backward prediction circuit 78, a frame memory 79, a frame memory 80, a dequantizer 81, and an IDCT circuit 82.

The encoders 60 or 70 is selected by the encoder selector 36 in accordance with the encoding system information of the attribute information supplied from the controller 7.

The blocking circuit 61 of the JPEG encoder 60 divides a sole picture into plural small-sized blocks, such as 8×8 pixel blocks. The DCT circuit 62 performs DCT on each 8×8 pixel block. The quantizer 63 divides the power of the block-based 64 pixel data by the quantization coefficient for quantization. The Huffman encoder 64 Huffman-encodes dc components in, for example, 64 spectral components outputted by the quantizer 63. The run-length encoder 65 run-length encodes the remaining quantized ac components. The multiplexing circuit 66 selects and synthesizes the Huffman-encoded data and the run-length encoded data.

The buffer memory 71 of the MPEG encoder 70 transiently stores data required for encoding. In general, the data stored is 1 GOP. Similarly to the DCT circuit 62, the DCT circuit 72 performs discrete cosine transform. The quantizer 73 divides the DCT values with the quantization number. The Huffman encoder 74 Huffman-encodes quantized data. The buffer memory 75 stores processed result data until a pre-set compact result is obtained and outputted. The motion vector detection circuit 76 detects the motion vector, that is checks to which position of another picture a reference picture block, termed a reference frame, composed in general of 16×16 pixels, has been moved. The forward prediction circuit 77 extracts from the frame memory 80 a block associated with the vector found from a temporally previous picture. The backward prediction circuit 78 extracts from the frame memory 79 a block associated with the vector found from a temporally posterior picture. The dequantizer 81 annuls quantization by the quantizer 73 for generating an encoded frame corresponding to the B- or P-frame. The IDCT circuit 82 performs IDCT for annulling the DCT performed by the DCT circuit 72. The frame memories 79, 80 store the picture reproduced by the dequantizer 81 and the IDCT circuit 82 for prediction processing performed by the forward prediction circuit 77 and the backward prediction circuit 78, respectively. To a subtractor 83 provided between the buffer memory 71 and the DCT circuit 72 is connected a movable contact a of a changeover switch 84. To fixed contacts b, c and e of the changeover switch 84 are supplied "0", an output of the forward prediction circuit 77 and an output of the backward prediction circuit 78, respectively. To a fixed terminal d is supplied a sum output of an adder 85 summing the output of the forward prediction circuit 77 and the output of the backward prediction circuit 78. Thus the subtractor 83 subtracts the output of the fixed terminals b, c, d or e as selected by the changeover switch 84 from the output of the buffer memory 71. That is, the the subtractor 83 subtracts "0", the forward prediction value (extracted block value), two synthesized values and the backward prediction value, from the frame being encoded, in case the prediction has not been possible, there is only forward prediction, there are both the forward prediction and backward prediction and there is only backward prediction, respectively. The adder 85 sums and synthesizes the forward and backward prediction values together. In case of a system of preparing a prediction frame by averaging forward and backward prediction frames for prediction, the adder 85 is used along with the changeover switch 87 having the movable contact a and the fixed contacts b, c for executing frame addition.

The output buffer memory 6 has the function of having communication with the controller 7, in addition to the function of converting the transfer rate of data sent out from the encoder 5.

Figure 16:
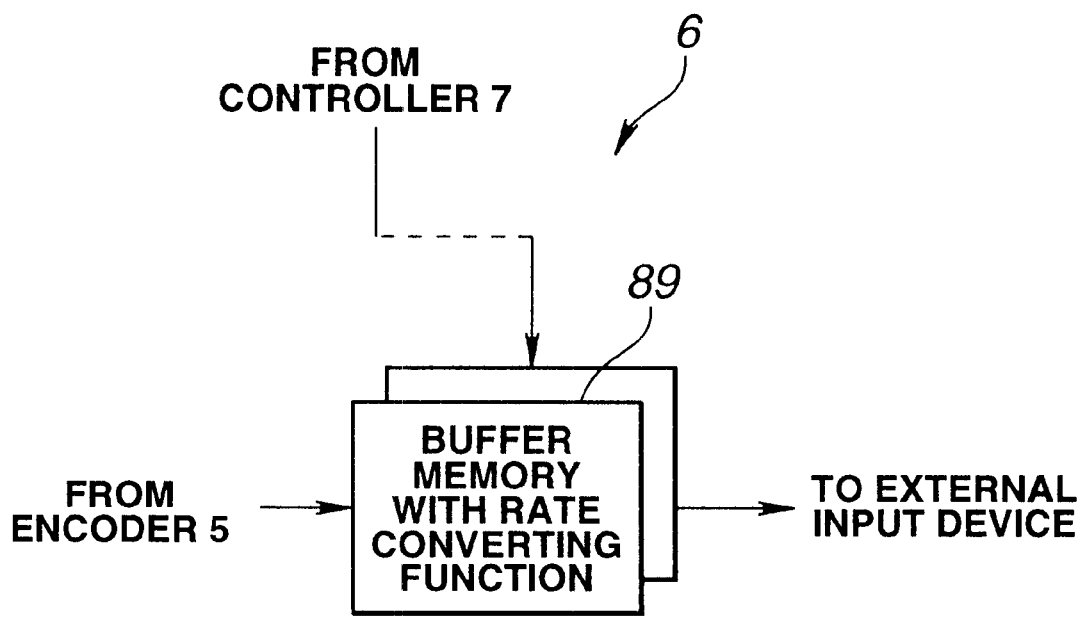
FIG. 16 is a block diagram showing a detailed structure of an output buffer memory of the picture signal processing device shown in FIG. 2.

The output buffer memory 6 is constituted by a buffer memory having a rate converting function 89, as shown in FIG. 16. The buffer memory having a rate converting function 89 transiently stores the compressed picture or the output picture for rate adjustment. Similarly to the buffer memory having a rate converting function 52 of the input buffer memory 3, the buffer memory having a rate converting function 89 has a sufficient capacity irrelevant to the picture size of the picture signals. The buffer memory having a rate converting function 89 is of a double buffer system, with each memory having an independently operating address generator. The address generator in each memory generates addresses in accordance with the picture size information of the attribute information supplied from the controller 7 and the picture input/output rate information. By adjusting the size of the address generating block and the block address interval, the internal rate of the picture system can be converted to various output rates. That is, optional rate conversion is possible in this output buffer memory 5.

The controller 7 has the function of controlling the processing by the matrix switcher 1, decoder 2, input buffer memory 3, picture processing unit 4, encoder 5 and the output buffer memory 6.

The operation of the picture signal processing device, as described above, is now explained.

The compressed picture signals, seized, switched and selected by the matrix switcher 1 as described above, has, at the leading end of the data, the header information containing the attribute information, such as the compression/non-compression discrimination information, information on the compression system, the information on the picture size dependent on the number of pixels in the horizontal and vertical directions, the information on the size of the processing screen designating a processing area, such as the information on the picture system, e.g., NTSC, PAL or RGB, or the input/output signal rate information.

The decoder 2 reads the header information and sends the picture attribute information to the controller 7. The controller 7 re-sends the compression/non-compression discrimination information, information on the compression system and the information on the picture size to the decoder 2. The decoder 2 can directly use or modify the attribute information it has read out without accepting the attribute information. The attribute information can also be supplied from the keyboard 8. The controller 7 sends the picture size information and the processing screen size information of the attribute information to the picture processing unit 4. The picture size information, picture system information and the picture input/output rate information of the attribute information are sent to the picture processing unit 4. The controller 7 also supplies the picture size information and the processing picture size information to the picture processing unit 4. The controller 7 also sends the compression/non-compression discrimination information, information on the compression system, information on the picture size and the information on the picture system of the attribute information to the encoder 5. The controller 7 also sends the information on the picture size and the information on the picture input/output rate to the output buffer memory 6.

When supplied with the switching command from the controller 7, the matrix switcher 1 switches the compressed picture data on the GOP basis.

The decoder 2 directly outputs the signal not in need of expansion processing to the input buffer memory 3, in accordance with the attribute information from the controller 7, while performing selected expansion processing on the signals in need of such expansion processing. The expansion processing determines the processing range in accordance with the picture size information. This permits the decoder 2 to expand the picture of an optional size.

Using the system conversion encoder 51, the input buffer memory 3 system-converts the above picture signals of the composite signals or the Y/C signals into component signals suited to internal processing in accordance with the picture size information from the controller 7. For the system conversion, the processing range is determined in accordance with the picture size information from the controller 7. In this manner, the system conversion processing becomes valid for a picture of an optional size. Since the component signals are converted in an internal processing rate, the signals are written at an input rate to the buffer memory having the rate converting function 52 so as to be read out at the internal rate. As described above, the buffer memory having the rate converting function 52 has a sufficient capacity irrelevant to the picture size of the picture signals. The buffer memory having a rate converting function 52 is of a double buffer system, with each memory having an independently operating address generator and doing read/write operations at a different block rate. Since the address area generated by the address generator is determined in accordance with the picture size information from the controller 7, conversion of the transfer rate becomes effective for any optional size picture.

The picture processing unit 4 designates an area of the picture memory 55 for storage of an optional size picture to sets the address range to be secured or used for read/write in accordance with the picture size information from the controller 7. This enables the picture processing unit 4 to process an optional size picture. The picture processing unit 4 also sets the picture processing range in accordance with the processing screen size information from the controller 7. This permits the picture processing unit 4 to use the resources of the processing system only for processing the designated range, so that wasteful resources of the processing system hitherto used for processing not reflected in the results can be used for other processing effectively.

The picture processing of the picture processing unit 4 is now explained. The picture signals, outputted by the input buffer memory 3, are sent to the picture processing unit 4. The picture signals, thus sent to the picture processing unit 4, are processed in accordance with instructions issued by the controller 7. The picture processing unit 4 has the picture processing controller 59 for managing control in the unit 4. The color conversion circuit 53 takes charge of color conversion on the pixel basis or on the pixel block basis in accordance with instructions issued by the picture processing controller 59. If color conversion is not required, the color conversion circuit 53 bypasses the picture signals in accordance with instructions issued by the picture processing controller 59. The picture signals via the color conversion circuit 53 are sent to the variable tap low-pass filter 54 where high-range signals are removed in readiness for deformation or contraction performed by the downstream side circuitry as later explained. The high-range signals need to be removed for preventing the high-range signals affecting the low-range signals as a result of deformation or contraction. How much of the high-range signals are removed is determined by the picture processing controller 59 instructing the width of the high-frequency range depending on the degree of deformation or contraction. If bandwidth limitation is not required, this processing function is by-passed under instructions issued by the picture processing controller 59. The picture signals via the variable tap low-pass filter 54 are sent to the picture memory 55 which is a working memory for executing two-dimensional and three-dimensional geometry transformation. The addresses used for geometry transformation are generated by the address generator 58 so as to be sent to the picture memory 55. Which addresses should be generated by the address generator 58 is commanded by the picture processing controller 59. These instructions are usually given as modeling data and conversion rule data. The data read out from the picture memory 55 are usually incomplete as raster data and are replete with numerous void pixels. These void pixels are buried by ambient pixels by the interpolation filter 56. The picture processing controller 59 instructs interpolation precision. The interpolation method may be exemplified by the nearest-neighbor method, linear interpolation method and a three-order interpolation method in the order of the increasing interpolation precision. The raster signals, obtained on interpolation of void pixels, are sent to the synthesis circuit 57, which then two-dimensionally or three-dimensionally synthesizes plural pictures. The picture processing controller 59 supplies control signals required for synthesis, such as depth information. The pictures are processed to a two-dimensional picture in the ultimate stage of synthesis so as to be displayed on the monitor 9.

The two-dimensional picture is sent to the encoder 5 for system conversion and encoding. The system conversion from the component signals is determined in accordance with the picture system information sent by the controller 7. Whether or not encoding should be performed or which encoding system should be used is determined by the compression/non-compression state discrimination information of the attribute information and the encoding system information sent from the controller 7. If system conversion processing or encoding (compression) is not required, the picture is sent to the output buffer memory 6 without processing. During system conversion processing or encoding, the designated image range is processed in accordance with the picture size information from the controller 7. This enables the encoder 5 to handle a picture of an optional size.

An output of the encoder 6 is entered to the output buffer memory 6. Similarly to the buffer memory having the rate conversion function 52 of the input buffer memory 3, the output buffer memory 6 has a sufficient capacity irrelevant to the picture size of the picture signals. The buffer memory 6 is of a double buffer system, with each memory having an independently operating address generator and having a buffer memory having the rate conversion function 89 doing read/write operations at a different block rate. Since the address area generated by the address generator is set in accordance with the picture size information from the controller 7, the optional picture rate can be converted by the output buffer memory 6.

As described above, the picture signal processing device of the present embodiment enables picture input/output or processing independent of the picture size and performs smooth switching of compressed pictures produced on, for example, inter-frame compression. In particular, by providing the matrix switcher 1, the as-switched compressed picture does not affect the expansion processing. In addition, the as-switched GOP need not be of the same frame structure, while the switched pictures need not be coincident in GOP phase. After switching and synthesis, the GOP information volume can be suppressed, while cut editing becomes possible.

Figure 17:
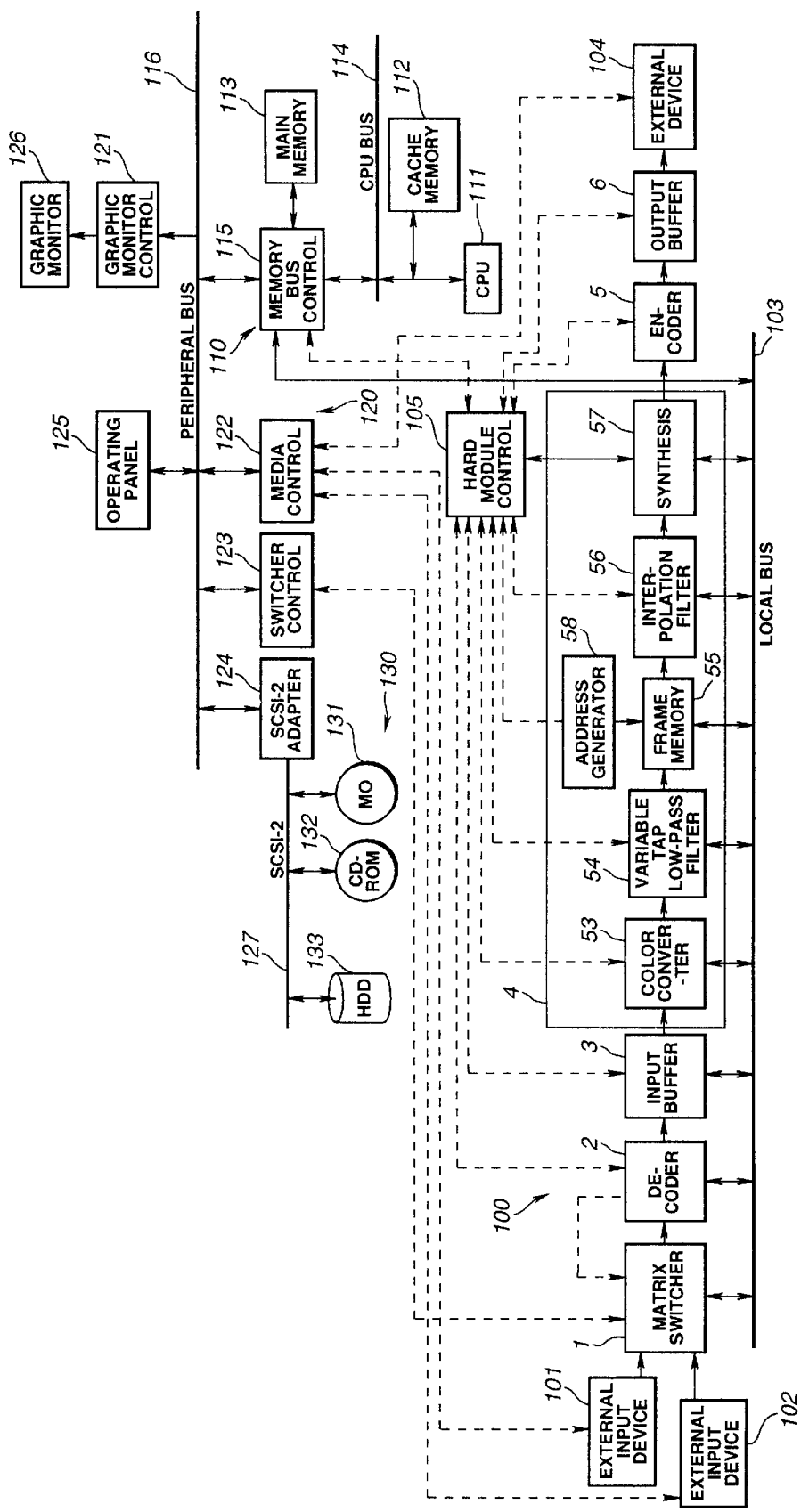
FIG. 17 is a schematic block diagram showing a picture signal processing device according to another embodiment of the present invention.

Referring to FIG. 17, a modification of the picture signal processing device of the present invention is explained. This modification includes a hard processor 100, a soft processor 110, an input/output controller 120 and a data storage unit 130.

In the present modification, processing is taken charge of by the hard processor 100 and the soft processor 110 for improving flexibility and amenability to expansion of the processing of the overall device. The hard processor 100 mainly takes charge of mechanical processing, such as a filter, or a software processing in need of high load. The soft processor 110 takes charge of intelligent processing and processing with high amenability to expansion.

The hard processor 100 is substantially of the same structure as the picture signal processing device of the previous embodiment explained with reference to FIG. 2. That is, plural compressed pictures, supplied form two external input devices 101, 102, are switched by the matrix switcher 1 so as to be supplied to the decoder 2 for expansion. The picture signals, expanded by the decoder 2, are sent to the input buffer memory 3. The signals via the input buffer memory 3 are sent to the picture processing unit 4 made up of the color conversion unit 53, variable tap low-pass filter 54, frame memory 55, interpolation filter 56, synthesis circuit 57 and the address generator 58. These units or circuits are connected by a local bus 103. The picture signals, processed by the picture processing unit 4, are outputted to the external output device 104 via encoder 5 and output buffer memory 6. These components are controlled by a hard module controller 105.

The soft processor 110 is made up of a CPU 111, a cache memory 112, a main memory 113, a CPU bus 114 and a memory bus controller 115. The memory bus controller 115 is connected to the local bus 103 and a hard module controller 105 for sending picture data and the control signal to the local bus 103 and to the hard module controller 105, respectively. The memory bus controller 115 is connected via a peripheral bus 116 to a graphics monitor controller 121, a media controller 122, a switcher controller 123, a small computer system interface (SCSI) adapter 124 and to an operating panel 125. The graphics monitor controller 121 has enclosed therein a video memory via which to control the display of the graphic monitor 126. The media controller 122 controls the external input device, such as a VTR or a data recorder, or its picture information input/output timing. The switcher controller 123 controls the matrix switcher 70. The SCSI adapter 124 is an interface for data storage devices, such as a magneto-optical disc (MO) device 131, a CD-ROM 132 or a hard disc device (HDD) 133. The operating panel 125 is used for commanding processing or input/output of the picture information.

The method for implementing the hard module usable from the software is executed when a subroutine library is called from the program being executed on the CPU 111. If the subroutine library is a software library, processing jumps to an associated program address as determined at the time of linking. In an address associated with the hard module, there is stored a procedure for sending necessary data to the hard module to start the execution to acknowledge the end of execution in order to revert the execution to the main program of the software. If, for example, the variable tap low-pass filter 34 is called as the hard module, data is sent under command by the CPU 111 from the main memory 113 via memory bus controller 115 and local bus 103 to the variable tap low-pass filter 34. The CPU 111 then instructs execution to the variable tap low-pass filter 34 via memory bus controller 115 and local bus 103. The CPU 111 acknowledges the end of execution and restores the processed data to the main memory 113 via local bus 103 and memory bus controller 115 to the main memory 113. Processing then reverts to the main program to execute the next step.

The picture signal processing device, shown in FIG. 17, can perform picture processing, such as generation, color conversion, synthesis or editing on pictures over a wide gamut from the still picture to a moving picture, free-format pictures not dependent on resolution or free-format pictures having different transfer rate or picture size while enhancing flexibility and amenability to expansion of the overall device. On the other hand, smooth switching of compressed pictures produced on, for example, inter-frame compression can be achieved accurately.

As another modification, plural units each made up of the CPU 111 and the cache memory 112 may be used for connection to the CPU bus 114. With this modification, parallel processing may be used in case of relieving the heavy load to some extent.

What is claimed is:

1. A picture signal processing apparatus comprising:
   selection means for selectively seizing a plurality of compressed pictures at a first certain transfer rate obtained in inter-frame compression, converting inter-frame forward predictively-coded pictures into intra-frame coded pictures, in terms of a pre-set number of frames as a unit, and modifying prediction data of bidirectional predictive-coded pictures to be in accordance with the conversion of said inter-frame forward predictively-coded pictures into said intra-frame coded pictures;
   expansion means for expanding compressed picture signals selected by said selection means;
   first input/output means for inputting/outputting, converting said picture processing signal into component signals and modifying the transfer rate of said picture signals outputted by said expansion means, said first input/output means including two separate memories;

picture processing means for performing various picture processing operations on picture signals outputted by said first input/output means for outputting processed picture signals;

compression means for compressing the processed picture signals outputted by said picture processing means for outputting compressed processed picture signals at a second certain transfer rate;

second input/output means separate from said first input/output means for inputting/outputting, converting said picture processing signal into component signals and modifying the transfer rate of said compressed picture signals outputted by said expansion means, said first input/output means including two separate memories; and control means for controlling the selecting operation by said selection means, expansion processing by said expansion means, input/output processing by said first input/output means, picture processing by said picture processing means, compression by said compression means and input/output processing by said second input/output means.

2. The picture signal processing apparatus as claimed in claim 1 wherein said selection means includes means for suppressing increase in the information volume caused by changes in the prediction data of said bidirectional predictive-coded pictures.

3. The picture signal processing apparatus as claimed in claim 1 wherein said expansion means reads out the attribute information including the compression/non-compression discrimination information, information on the compression system, the information n the picture size dependent on the number of pixels in the horizontal and vertical directions, the information on the size of the processing screen designating a processing area, the information on the picture system, or the input/output signal rate information and sends the read-out attribute information to said control means.

4. The picture signal processing apparatus as claimed in claim 1 wherein said first input/output means includes a system converter for converting the system of picture signals and a storage unit having a sufficient capacity irrelevant to the picture size of the picture signals.

5. The picture signal processing apparatus as claimed in claim 1 wherein said second input/output means includes a storage unit having a sufficient capacity irrelevant to the picture size of the picture signals.

6. The picture signal processing apparatus as claimed in claim 1 wherein said compression means has a system converter for converting the system of said picture signals.

7. A picture signal processing apparatus comprising control means for generating signals indicating switching positions;

processing means for performing pre-set processing on first compressed picture signals and second compressed picture signals, compressed by intra-frame compression and inter-frame compression, respectively, based on the signals specifying said switching positions supplied from said control means, said processing means converting P-pictures of said first compressed picture signals associated with the signals specifying said switching positions into I-pictures, modifying prediction data for B-pictures of said first compressed picture signals associated with the signals specifying said switching positions, converting P-pictures of said second compressed picture signals associated with the signals specifying said switching positions into I-pictures, and modifying prediction data for B-pictures associated with the signals specifying said switching positions, and selection means for selectively outputting said first compressed picture signals and said second compressed picture signals, converted or modified by said processing means, based on said signals specifying said switching positions.

\* \* \* \* \*